United States Patent
Ngo et al.

(10) Patent No.: US 11,575,757 B2
(45) Date of Patent: *Feb. 7, 2023

(54) CLOAKED REMOTE CLIENT ACCESS

(71) Applicant: DH2I COMPANY, Fort Collins, CO (US)

(72) Inventors: Thanh Q. Ngo, Oregon City, OR (US); Samuel Revitch, Portland, OR (US)

(73) Assignee: DH2I COMPANY, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,533

(22) Filed: Dec. 28, 2020

(65) Prior Publication Data

US 2021/0126979 A1    Apr. 29, 2021

Related U.S. Application Data

(63) Continuation-in-part of application No. 16/903,933, filed on Jun. 17, 2020.

(Continued)

(51) Int. Cl.
*H04L 67/141* (2022.01)
*H04L 69/16* (2022.01)
(Continued)

(52) U.S. Cl.
CPC ........ *H04L 67/141* (2013.01); *H04L 12/4633* (2013.01); *H04L 63/029* (2013.01); *H04L 69/16* (2013.01); *H04L 63/166* (2013.01)

(58) Field of Classification Search
CPC ..... H04L 67/141; H04L 69/16; H04L 63/029; H04L 12/4633; H04L 63/166; H04L 63/0272

See application file for complete search history.

(56) References Cited

U.S. PATENT DOCUMENTS

| 7,992,201 B2 * | 8/2011 | Aldridge | H04L 63/0272 726/15 |
| 8,020,203 B2 * | 9/2011 | Kumar | H04L 63/0272 726/15 |

(Continued)

FOREIGN PATENT DOCUMENTS

| EP | 3198464 A1 | 3/2016 |
| WO | 2016049609 A1 | 3/2016 |

OTHER PUBLICATIONS

Tschofenig, H., et al., "Transport Layer Security (TLS) / Datagram Transport Layer Security (DTLS) Profiles for the Internet of Things," Internet Engineering Task Force (IETF); ISSN 2070-1721; Jul. 2016; http://www.rfc-editor.org/info/rfc7925.

(Continued)

*Primary Examiner* — Patrice L Winder
(74) *Attorney, Agent, or Firm* — Martensen IP; Michael C. Martensen

(57) ABSTRACT

A datagram oriented UDP protocol is used for communication between tunnel gateways in a wide area network. Lightweight remote client accesses network services using TCP tunneling. Each remote client maintains one or more UDP/IP+DTLS communication channels to a single member of the gateway group. Gateway servers belonging to the gateway group form some interconnection topology linking each gateway server to each other gateway server, whereby each gateway server maintains a communication channel with every other gateway server in the gateway group. Through the links between gateway servers, a remote client may access any application provided by any gateway server within the gateway group regardless of which gateway server it is connected to, which serves to cloak its communication patterns.

23 Claims, 13 Drawing Sheets

Related U.S. Application Data

(60) Provisional application No. 62/862,438, filed on Jun. 17, 2019.

(51) Int. Cl.
*H04L 9/40* (2022.01)
*H04L 12/46* (2006.01)

(56) References Cited

U.S. PATENT DOCUMENTS

| | | | |
|---|---|---|---|
| 8,234,702 | B2 | 7/2012 | Maes |
| 8,843,639 | B2* | 9/2014 | Jewell ................ H04L 63/08 709/227 |
| 8,990,901 | B2 | 3/2015 | Aravindakshan |
| 9,037,709 | B2 | 5/2015 | Enns |
| 9,215,131 | B2 | 12/2015 | Frey |
| 9,241,044 | B2* | 1/2016 | Shribman ............ H04L 67/32 |
| 9,270,449 | B1* | 2/2016 | Tribble .............. H04L 9/0838 |
| 9,342,293 | B2 | 5/2016 | Enns |
| 9,467,454 | B2 | 10/2016 | Aravindakshan |
| 9,577,909 | B2 | 2/2017 | Li |
| 9,577,927 | B2 | 2/2017 | Hira |
| 9,661,005 | B2 | 5/2017 | Kamble |
| 9,906,497 | B2* | 2/2018 | Glazemakers ........ H04L 69/14 |
| 10,027,687 | B2 | 7/2018 | Kamble |
| 10,038,669 | B2 | 7/2018 | Kizu |
| 10,348,767 | B1 | 7/2019 | Lee |
| 10,382,401 | B1 | 8/2019 | Lee |
| 10,397,189 | B1 | 8/2019 | Hashmi |
| 10,412,048 | B2* | 9/2019 | Glazemakers ...... H04L 63/0236 |
| 10,601,779 | B1* | 3/2020 | Matthews ........... H04L 67/141 |
| 10,679,039 | B2 | 6/2020 | Gallagher |
| 2003/0088698 | A1 | 5/2003 | Singh |
| 2004/0088385 | A1* | 5/2004 | Blanchet ............. H04L 67/14 709/220 |
| 2005/0002412 | A1 | 1/2005 | Sagfors |
| 2005/0163061 | A1 | 7/2005 | Piercey |
| 2006/0029016 | A1 | 2/2006 | Peles |
| 2006/0235939 | A1 | 10/2006 | Yim |
| 2006/0245373 | A1 | 11/2006 | Bajic |
| 2006/0268834 | A1 | 11/2006 | Bajic |
| 2007/0002833 | A1 | 1/2007 | Bajic |
| 2008/0045267 | A1 | 2/2008 | Hind |
| 2008/0072307 | A1 | 3/2008 | Maes |
| 2008/0144625 | A1 | 6/2008 | Wu |
| 2008/0291928 | A1 | 11/2008 | Tadimeti |
| 2008/0301799 | A1 | 12/2008 | Arnold |
| 2009/0040926 | A1 | 2/2009 | Li |
| 2009/0122990 | A1 | 5/2009 | Gundavelli |
| 2009/0138611 | A1 | 5/2009 | Miao et al. |
| 2009/0287955 | A1 | 11/2009 | Matsumoto |
| 2010/0125903 | A1 | 5/2010 | Devarajan |
| 2010/0161960 | A1 | 6/2010 | Sadasivan |
| 2010/0246545 | A1 | 9/2010 | Berzin |
| 2011/0082941 | A1 | 4/2011 | Kim |
| 2011/0153793 | A1 | 6/2011 | Tan |
| 2011/0202610 | A1 | 8/2011 | Chaturvedi |
| 2012/0162445 | A1 | 6/2012 | Kim |
| 2012/0166593 | A1 | 6/2012 | Yoon et al. |
| 2012/0226820 | A1 | 9/2012 | Li |
| 2013/0133043 | A1 | 5/2013 | Barkie |
| 2013/0204988 | A1 | 8/2013 | Grewal |
| 2013/0283364 | A1 | 10/2013 | Chang |
| 2013/0298201 | A1 | 11/2013 | Aravindakshan |
| 2014/0200013 | A1 | 7/2014 | Enns |
| 2014/0207854 | A1 | 7/2014 | Enns |
| 2014/0269774 | A1 | 9/2014 | Callard |
| 2015/0026262 | A1 | 1/2015 | Chaturvedi et al. |
| 2015/0188949 | A1* | 7/2015 | Mahaffey .............. H04W 12/37 726/1 |
| 2015/0195293 | A1 | 7/2015 | Kamble |
| 2015/0195684 | A1 | 7/2015 | Lohmar |
| 2015/0229649 | A1 | 8/2015 | Aravindakshan |
| 2015/0381484 | A1 | 12/2015 | Hira |
| 2016/0112372 | A1 | 4/2016 | Katz |
| 2016/0337104 | A1 | 11/2016 | Kalligudd |
| 2017/0006034 | A1 | 1/2017 | Link, II |
| 2017/0134399 | A1 | 5/2017 | Kamble |
| 2017/0149548 | A1 | 5/2017 | Mouhouche |
| 2017/0223063 | A1 | 8/2017 | Herrero |
| 2017/0237708 | A1 | 8/2017 | Klaghofer |
| 2018/0026811 | A1 | 1/2018 | Herrero |
| 2018/0054388 | A1 | 2/2018 | Herrero |
| 2018/0077267 | A1 | 3/2018 | Bayer |
| 2019/0089557 | A1 | 3/2019 | Snug |
| 2019/0182155 | A1 | 6/2019 | Chang |

OTHER PUBLICATIONS

PCT/US2019/045425; International Search Report and Written Opinion of the International Searching Authority; dated Oct. 24, 2019.
PCT/US2019/045431; International Search Report and the Written Opinion of the International Searching Authority; dated Oct. 28, 2019.
Reardon, Joel, et al.; "Improving Tor using a TCP-over-DTLS Tunnel"; May 25, 2009; http://www.cypherpunks.ca/~iang/pubs/TorTP.pdf (15 pages).
PCT/US2019/045430; International Search Report and Written Opinion of the International Searching Authority; dated Oct. 24, 2019.
PCT/US2019/048355; International Search Report and the Written Opinion of the International Searching Authority; dated Oct. 28, 2019.
Tan, J., et al.; "Optimiing Tunneled Grid Connectivity Across Firewalls"; CRPIT vol. 99, Grid Computing and e-Research 2009; Proc. 7th Australasian Symposium on Grid Computing and e-Research (AusGrid 2009), Wellington, New Zealand; pp. 21-28.
PCT/US2019/045425; International Preliminary Report on Patentability; The International Bureau of WIPO; dated Feb. 18, 2021.
PCT/US2019/045430; International Preliminary Report on Patentability; The International Bureau of WIPO; dated Feb. 18, 2021.
PCT/US2019/045431; International Preliminary Report on Patentability; The International Bureau of WIPO; dated Feb. 18, 2021.
PCT/US2019/048355; International Preliminary Report on Patentability; The International Bureau of WIPO; dated Mar. 11, 2021.

* cited by examiner

CLOAKED REMOTE CLIENT ACCESS

The present application is a Continuation-In-Part of, relates to and claims the benefit of U.S. patent application Ser. No. 16/903,933 filed 17 Jun. 2020 which claims priority to U.S. Provisional Patent Application No. 62/862,438 filed 17 Jun. 2019, of which both are incorporated by reference in their entirety for all purposes as if fully set forth herein.

BACKGROUND OF THE INVENTION

Field of the Invention

Embodiments of the present invention relate, in general, to covertly allowing remote client access to server applications over the internet by forwarding application-level TCP connections between tunnel servers.

Relevant Background

TCP tunneling secures transmissions by encapsulating and encrypting packets. The Secure Shell (SSH) software application is a known technology that provides TCP tunneling functionality as it establishes point-to-point TCP connections between sites, and provides authentication and basic internal services, including access to a command shell and files on the server side. It can be configured to open TCP tunnels from one side to the other. To accomplish reliable and secure transmission of data, SSH uses TCP as the communication channel between the tunnel gateway components. The use of TCP is complex and resource expensive. A need exists to use a simplified communication channel to allow remote clients to tunnel TCP traffic while retaining cloaking, reliability and versatility. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Combining TCP and UDP communication features establishes a secure and reliable, yet fast and flexible, connection between a remote device and the gateway server. While TCP tunneling provides reliable, ordered, and error-checked delivery of data, its complexity results in a slower transport and easily tracked. UDP communication techniques provides minimal, unreliable, obscure, message-passing transport, while its simplicity allows for quick cloaked data transport with low overhead. The present invention introduces the pipe communication scheme, which combines the speed and flexibility of UDP communication channels with TCP tunneling reliability and security.

According to one embodiment of the present invention, a computer implemented system for cloaked remote client access to server applications comprises a remote client having a client application and one or more servers within a server cluster, each having one or more client tunnel gateway modules linked to one or more server applications. In one version of the present invention, servers operating as a server cluster form an overlay network wherein each server includes a server tunnel gateway module. Each gateway module includes one or more UDP communication sockets that mediate connectivity between the client tunnel gateway module and a server tunnel gateway module as a control connection. Once connected the server tunnel gateway module forms a list of available tunnels for the connected client tunnel gateway module.

In response to a lack of connectivity between a remote client tunnel gateway module and a server tunnel gateway module, the remote client selects a new gateway server from the list of available gateway servers provided by the intermediary registry server and reestablishes connectivity to the server applications from the list of available tunnels. In doing so the client tunnel gateway module opens one or more UDP ports to connect with a new gateway server. As the gateway servers are communicatively coupled, each includes a port remapping table by which to redirect the remote client to the appropriate server application.

According to one embodiment of the present invention the client tunnel gateway module includes TCP listeners that are open of an application tunnel with the client application. This connection eventually establishes an application tunnel connection mapped between the client tunnel origin and the client tunnel gateway. The server tunnel destination may be located on any server within the server cluster. Similarly, one or more server pipe listeners have an open pipe port to connect the client tunnel gateway with the server tunnel gateway. Thereafter a tunnel connect is formed between the client tunnel origin and the server tunnel destination. Lastly, the tunnel destination opens a TCP connection with the server application connecting the server application with the client application.

Another aspect of the present invention is that connectivity between the client tunnel gateway module and the server tunnel gateway module is via UDP/IP protocols with DTLS secure encapsulation. Additionally, an intermediary registry coupled to each of the servers in the cluster and the remote client maintains a list of available servers. And responsive to a remote client connecting with a server gateway in the cluster, the server gateway tunnel module creates a client context for that remote client that includes a port remap table having an entry for each available tunnel thereby forming, for that client, a list of available tunnels.

A methodology of the present invention for cloaked remote client access to one or more server applications establishes a secure connection between a remote device and a gateway server using UDP/IP protocols with DTLS secure encapsulation. A list of available TCP tunnels is received by the remote device from the gateway server wherein the list comprises the name of a given tunnel, a pipe port, and a default TCP listener address for each tunnel. By ascertaining the availability of a given tunnel from this list, the remote client opens one or more local pipe ports, each of which correspond to a default TCP listener address. As such, a new connection to a TCP listener will cause a new pipe connection to an assigned tunnel pipe port yet done so with the speed and simplicity of UDP techniques.

In one instance of the present invention a remote device discovers an undiscovered UDP endpoint for the gateway server. By the remote client initiating a DTLS handshake with a discovered UDP endpoint for the gateway server, the gateway server opens a pipe port to the remote client resulting in a control connection. The DTLS handshake makes use of a public key, and once this authentication is complete, a pipe connection to the pipe port is made establishing the control connection between the remote client and the gateway server. With the DTLS handshake complete, the remote client sends an authorization request through the control connection to the gateway server for access to one or more tunnels. A port remap table resident on each server has an entry for each available tunnel, helping form and confirm tunnel availability for the remote client. This allows the mapping of each authorized tunnel to a unique pipe port.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
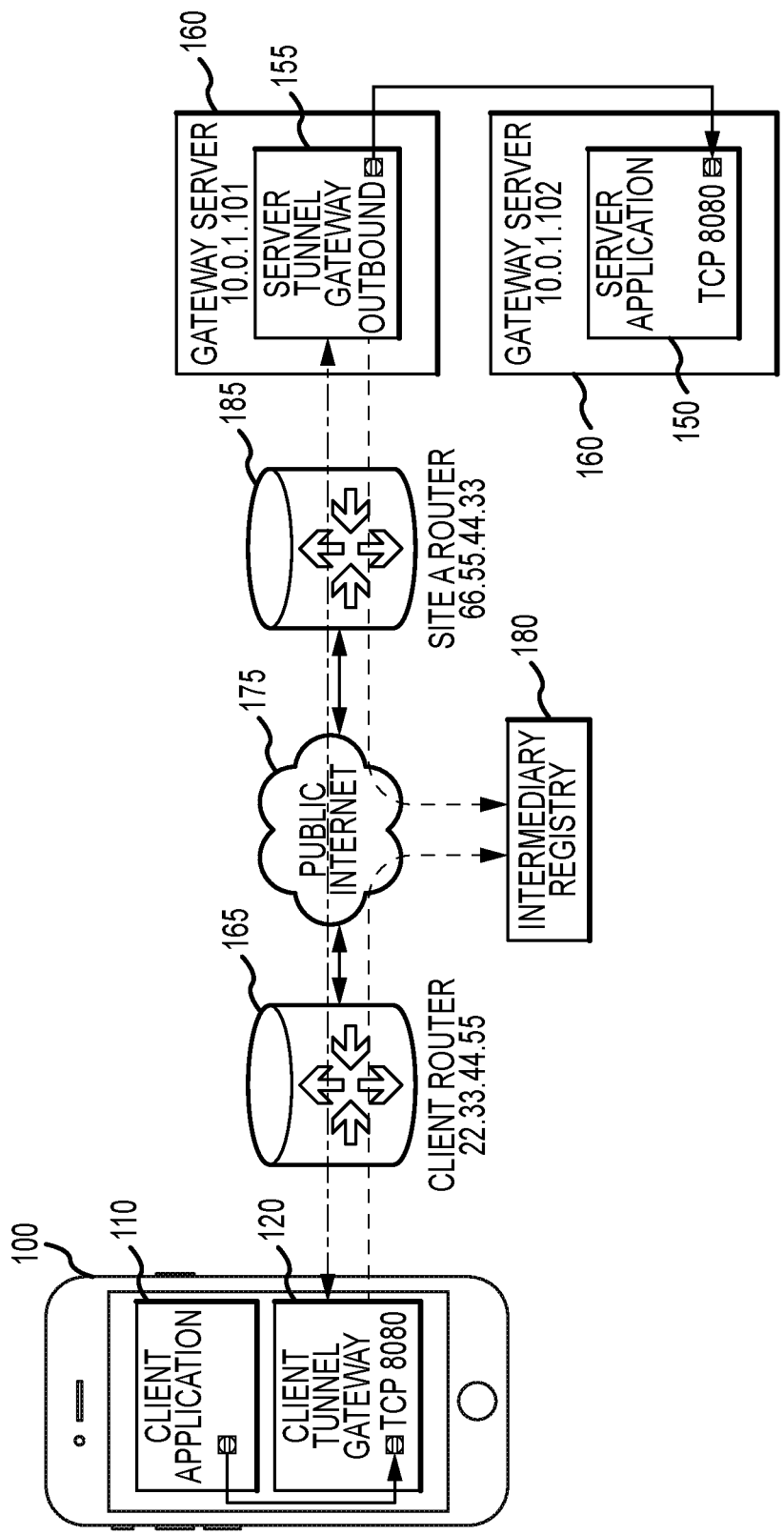
FIG. 1 is a high-level depiction of a network configuration for cloaked remote client access according to one embodiment of the present invention.

The Figures depict embodiments of the present invention for purposes of illustration only and like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

The present invention enables cloaked remote client access to one or more server-based applications via TCP tunneling over the public Internet through a specialized role of a remote client to server control connection. Broadly, the present invention describes a method of providing, and controlling access to, TCP network services to lightweight remote clients. The disclosed system and methodology provide for flexible authentication of remote clients, fine-grained access control of specific clients to TCP network services, and highly available, fault-tolerant access to the network services.

One embodiment of the present invention specifies the use of the datagram oriented UDP protocol for communication between tunnel gateways. The use of the datagram oriented UDP protocol rather than TCP as the transport simplifies the design and is chosen for at least two reasons:

Endpoint discovery on NAT routers is substantially more reliable using UDP;

UDP allows for more accurate assessment of liveness of peers, as every message received from a peer is processed by a component of the invention, whereas with TCP, the host networking stack will not inform the application of any message that does not contain the next unreceived data block.

UDP makes it harder for an unwanted 3rd party to eavesdrop on transmitted data, as data messages are scrambled and delivered unordered.

The present invention, accordingly, encourages the use of a single UDP port for communication between servers, as well as with an endpoint (intermediary) registry server. This supports the goal of reliable endpoint discovery.

The present invention also facilitates using direct communication between two servers in situations where one server sits behind a symmetric NAT router, as long as the other server does not also sit behind a symmetric NAT router. This is enabled by bidirectional attempts to initiate communication, where the outbound attempt from the server behind the non-symmetric NAT may be blocked by the symmetric NAT, but the outbound attempt of the server behind the symmetric NAT will not be blocked by the non-symmetric NAT.

The invention additionally describes a method of statically configuring tunnels. One implementation of the present invention is part of a high-availability application clustering software product. The high-availability clustering product manages applications that can run on any one server of the server cluster and move between servers in response to failures. An extension of the present invention is to automatically establish tunnel origins on inactive servers to support application access from any server, regardless of which server on which the application is active.

The invention also provides secure, private TCP communication between disconnected/geographical diverse networks. It provides functionality similar to a VPN yet with greater security processes. The invention can be integrated with an application management platform, to provide automatic connectivity of distributed applications across the public Internet. This can support simplified configuration of high-availability, replication, and disaster recovery features, without the need for a VPN, or any reconfiguration of the host networking stack.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

For clarity, the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

For the purpose of the present invention the following acronyms and terms are assumed to represent and should be interpreted as:

DTLS Datagram Transport Layer Security. A method for establishing private, authenticated communication channels over non-reliable, out-of-order datagram communication channels such as UDP.

GRE Generic Routing Encapsulation, a simplified datagram-oriented protocol used by certain VPNs to exchange layer-2 or layer-3 traffic. GRE itself may be considered layer-4 in the OSI model, as it sits above layer-3 protocols, but is considered to break the layering order by containing messages from lower layers.

Host Networking Stack—The primary network state machine running on a server or any other networked computer and is typically, part of the operating system kernel. The Host Networking Stack provides layer-4 socket services for TCP and UDP protocols, as well as state machines for layer-3 protocols such as IPv4/IPv6, layer-2 protocols, network hardware drivers, and virtual network drivers for VPNs.

IP—Internet Protocol. Occupies layer-3 in the OSI model. The Internet Protocol is responsible for ensuring packets are sent to the correct destination.

IPv4—Internet protocol version 4, with a 32-bit address space.

ISP—Internet Service Provider.

LAN—Local Area Network.

NAT Network Address Translation, a technology used prolifically to connect local area networks to the public Internet. NAT enables a plurality of servers (computers) to interact with the public internet via a single external IPv4 address.

OSI Model—Open Systems Interconnection model, a standard characterization of functional layers of networking using seven layers as opposed to the four layers of the TCP model.

Port—A Port is opening on a machine through which data can flow.

Port Forwarding—A technique provided by most NAT routers to allow connections from the public Internet to an internal server.

Pipe—The TCP-like communication protocol incorporated by the invention in order to provide stream-oriented, reliable, in-order message delivery similar to TCP, but over UDR/IP protocols.

Pipe Listener—A pipe listener is the server-side component of the pipe communication scheme, which can accept incoming pipe connection requests.

Socket—A network Socket is an endpoint instance application, defined by a hostname or IP address and a port, for sending or receiving data within a node on a computer network. A socket is a representation of an endpoint in networking software or protocol stack and is logically analogous to physical female connections between two nodes through a channel wherein the channel is visualized as a cable having two mail connectors plugging into sockets at each node. For two machines on a network to communicate with each other, they must know each other's endpoint instance (hostname/IP address) to exchange data.

TCP—Transmission Control Protocol, a stream-oriented, reliable-delivery data transfer protocol. The Transmission Control Protocol provides a communication service at an intermediate level between an application program and the Internet Protocol. It provides host-to-host connectivity at the transport layer of the Internet model. An application does not need to know the particular mechanisms for sending data via a link to another host, such as the required IP fragmentation to accommodate the maximum transmission unit of the transmission medium. At the transport layer, (layer 4 in the OSI model) TCP handles all handshaking and transmission details and presents an abstraction of the network connection to the application typically through a network socket interface.

TCP Listener—A TCP Listener is the server-side counterpart of a TCP connection. It is used to accept incoming connections over TCP.

TCP Tunnel—A tunnel for a single TCP connection, which constitutes a TCP connection from a client application to the tunnel provider, and a separate TCP connection from the tunnel provider to the server application.

Transport Layer Security. A method for establishing private, authenticated communication channels over stream-oriented communication channels such as TCP.

Tunnel or Tunneling Protocol (also referred to herein as a channel)—In computer networks, a tunneling protocol is a communications protocol that allows for the movement of data from one network to another. It involves allowing private network communications to be sent across a public network (such as the Internet) through a process called encapsulation. Because tunneling involves repackaging the traffic data into a different form, perhaps with encryption as standard, it can hide the nature of the traffic that is run through a tunnel. The tunneling protocol works by using the data portion of a packet (the payload) to carry the packets that actually provide the service. Tunneling uses a layered protocol model such as those of the OSI or TCP/IP protocol suite.

UDP—User Datagram Protocol, a not-necessarily-in-order datagram delivery protocol, used over IP. UDP uses a simple connectionless communication model with a minimum of protocol mechanisms. UDP provides checksums for data integrity, and port numbers for addressing different functions at the source and destination of the datagram. UDP does not use any handshaking dialogues, and thus exposes the user's program to any unreliability of the underlying network. Occupies layer-4 in the OSI model.

VPN—Virtual Private Network. A layer-2 or layer-3 networking technology that allows local networks to be securely extended or bridged over WANs, such as the public Internet.

WAN—Wide Area Network. A network that typically connects distant sites to one another or to the public Internet. The public Internet is considered a WAN.

WSFC—Microsoft Windows Server Failover Clustering; software that allows servers working together as a computer cluster.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

Included in the description are flowcharts depicting examples of the methodology which may be used for TCP tunnel forwarding. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

In the most basic example, the present invention involves five participating components, as depicted in FIG. 1. FIG. 1 presents a component diagram of one embodiment of the present invention with a remote client 100 having one or more TCP client applications 110 communicatively coupled to a server application 150 resident on a server 160 within the cluster. In the example depicted in FIG. 1 the remote client application 110 is running on an end user device 100 such as mobile phone, a tablet, or a desktop PC. One of reasonable skill in the relevant art will appreciate that the depiction of the remote light weight client as a mobile phone is merely illustrative and not limiting.

As shown in FIG. 1, one or more client applications 110 operates on the device 100 and is communicatively coupled to a remote client agent also revered to herein as a client tunnel gateway module 120. The client tunnel gateway module 120 opens one or more listening TCP ports locally to which the client application 110 is able to connect, via TCP. Upon connection, the client application 110 is able to access the client tunnel gateway module 120 for network access. The remote client 100 is, in this example and as depicted in FIG. 1, connected to the public Internet 175 and may be connected directly, or behind a NAT router 165 as shown.

An intermediary registry 180 instance (also referred to herein as a matchmaking service) is also communicatively coupled to the public Internet 175 and to each remote client 100. The intermediary registry 180 enables the remote client 100 to locate gateway servers 160 in a specified group and establish direct communication with at least one of the active gateway servers. All active gateway servers 160 and active remote clients 100 maintain contact with the intermediary registry 180, and their addresses and external port mappings can be queried by remote clients 100 seeking to connect to a gateway server 160. In one embodiment of the present invention, all communication with the intermediary registry 180 is done using the UDP/IP protocol with the DTLS secure encapsulation.

FIG. 1 further includes one or more gateway servers 160 communicatively coupled to the public Internet 175 directly or through a NAT router 185. As with the remote client 100, each gateway server 160 may also be coupled to the Internet 175 directly. According to one embodiment of the present invention, one of a plurality gateway servers 160 accepts and mediates connectivity with the remote client 100 using one or more UDP communication sockets. Gateway servers 160 are typically organized into gateway groups, and while the example above includes only one gateway server 160, many gateway servers can participate in the same group. A remote client 100 selects one gateway server 160 using the intermediary registry 180, establishes communication with it using UDP/IP and DTLS, and authenticates to it. Resident on one or more servers in the cluster, is a server application 150 to which the remote client seeks access.

A TCP server application 150 is a server application that uses TCP protocols to interact with its clients over a network 175. To do so the server application 150 creates one or more TCP listening ports through which clients 100 may connect. The invention facilitates lightweight remote client access to these network services using TCP tunneling. For each TCP connection made by client application 110 to a client tunnel gateway 120 module resident on a remote client 100, a gateway server 160 will make a corresponding TCP connection between a server tunnel gateway 155 and the server application 150.

Figure 2:
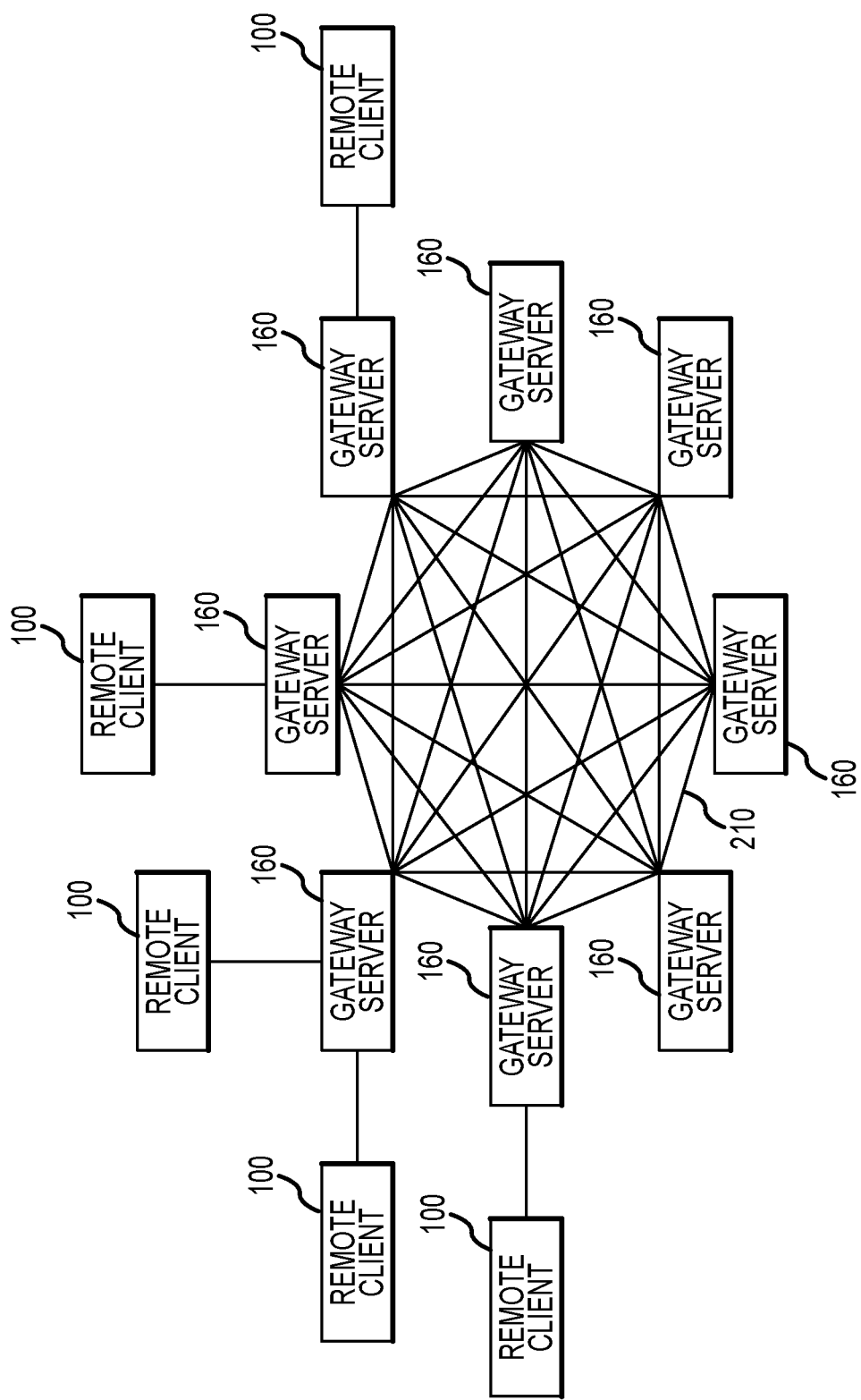
FIG. 2 shows a network remote client and gateway server topology, according to one embodiment of the present invention.

FIG. 2 presents a high-level block diagram view of a remote client 100 to gateway server connectively via a public Internet, according to one embodiment of the present invention. As shown a plurality of remote clients 100 are each communicatively connected to one gateway server 160. In this instance, a group of eight gateway severs 160 are depicted and five remote clients 100. A listing of the gateway servers is maintained by the intermediary registry (not shown), which, in one instance of the present invention, may reside within a gateway server. Each remote client maintains a UDP/IP+DTLS communication channel with a single member of the gateway group. Gateway servers belonging to the gateway group form an interconnection topology 210 linking each gateway server to each other gateway server. By doing so, each gateway server maintains a communication channel with every other gateway server in the gateway group. In its fundamental form, a client application resident on a remote client seeks services offered by a server application resident on a gateway server or a server within the cluster coupled to a gateway server. A UDP communication link is established between the remote client and the gateway server. That gateway server communicates with other servers in the group including one on which the server application resides. Thereafter a TCP tunnel is formed enabling the client application to interact with the server application. As will be appreciated by one of reasonable skill in the art, for a variety of reasons the communication link between the remote client and the first gateway server may fail. Upon a remote client losing connectivity with a gateway server, the remote client accesses the list of active gateway servers in the group via the intermediary registry and reestablishes connectivity with another gateway server. As all of the gateway servers are communicatively coupled and are aware of the prior tunnel between the client application and the server application, this new gateway server uses a remapping list to redirect the connection and reestablish the TCP tunnel.

Figure 3:
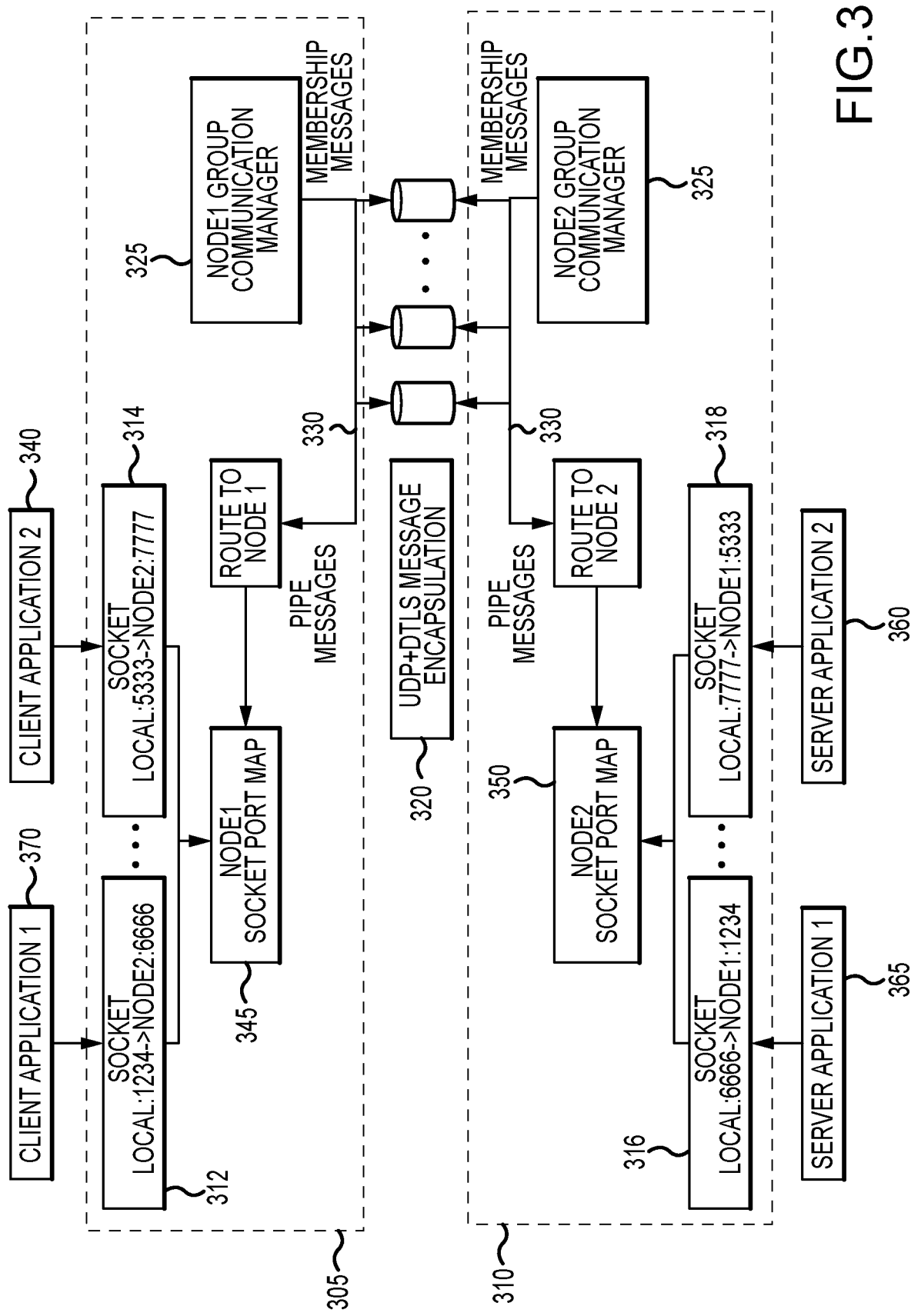
FIG. 3 presents a logical depiction, according to one embodiment of the present invention, of UDP communication tunneling between a client application and a server application.

FIG. 3 is a logical depiction of a TCP tunneling using a secure UDP channel between a plurality of nodes on distribute computing resources. With reference to FIG. 3 and according to one embodiment of the present invention, a pair of tunnel gateway modules 305, 310 manages any number of individually tunneled connections. FIG. 3 is a logical depiction of communication traffic between two nodes (e.g., a remote client and a gateway server) in a server cluster. A characteristic of the origin tunnel gateway module 305, according to the present invention, is to have a plurality of listening TCP sockets 312, 314 accept connections. Each connection accepted on the listening socket constitutes a separate communication session that results in a separate outbound TCP connection initiated by the destination tunnel gateway 310.

The logical connection in FIG. 3 is between Node1 (remote client) and Node2 (gateway server) through a UDP DTLS channel 320, 330. Messages sent over a UDP DTLS channel comes in at least two forms, serving different purposes. These include:

Group Communication Protocol messages ("Membership messages.") also knows as Datagram messages, are the most basic form of communication. These messages managed by a group communication manager 325, are used to determine the responsiveness of other members of the server cluster, to reach a group consensus over which servers that are currently available, or which server is the cluster coordinator. Like the underlying UDP/IP transport layer, datagram messages are unreliable and subject to reordering and duplication. Datagram messages are also subject to message length limitations imposed by the underlying network, which can require fragmentation and reassembly of large messages. These messages do not need to be reliably delivered, or delivered in any specific order, but must be delivered as soon as possible, in order to quickly react to loss of communication.

Pipe messages are used to implement reliable, ordered message streams, similar to TCP. Pipe messages 330 provide reliable-delivery, stream-oriented channels, similar to Transmission Control Protocol (TCP) messages. Like TCP, pipe messages are sent between socket state machines that maintain connection states, queues of inbound and outbound data, and use acknowledgments and retransmissions to ensure reliable delivery of data. Pipe messages include sender and receiver port numbers, which allow specific services and tunnels to be associated with certain listening port numbers and allow multiple sockets to be multiplexed over a single communication channel. Pipe messages operate in socket session contexts and are multiplexed and routed using port numbers similar to TCP. Data on pipe sockets are delivered reliably and in order, and bear traffic for all higher-level cluster management functions. Pipe messages require a complex state machine to generate and process.

Using a pre-shared key Node1 and Node2 establish a secure channel by which pipe messages can be exchanged. For example, local socket instance 5333 of Node1 314 linked to client application 2 340 is tunneled through Node1's socket port map 345 to the Node2's socket port map 350 to Node2's local socket instance 7777 318 linked to server application 2 360. Similarly, an instantiation of server application 1 365 linked to local socket instance 6666 316 at Node2 is tunneled through Node2's socket port map 350 to Node1's socket port map 345 to arrive at Node1's local socket instance 1234 312 linked to client application 1

370. As each node may have multiple instances and each LAN may have a multiplicity of nodes, a communication manager 325 for both Node2 and Node2 manages the pipes 330 and their membership with the peer group.

The remote client and the gateway server (nodes) each have a socket port map used to track the local end of each open pipe connection, as well as listening sockets. Each entry in the socket port map tracks three details:

The local pipe port number;

Details of the remote host, which can be a gateway server, a locally connected remote client, or a remotely connected remote client;

The remote pipe port number.

New pipe sockets are created and added to the socket port map when (a) a listening pipe socket is created, (b) a connecting pipe socket is created, and (c) a listening pipe socket accepts a new connection. When a listening pipe socket is created it is bound to a port on which it listens, yet it does not link the pipe to a remote host or a remote port, as it is not actually connected. When a connecting pipe socket is created, it is bound to a random unused port, and to the remote host and port to which it is connected. When a new connection on a listening pipe socket is accepted, it is bound to the local listening port, and the remote host and port of the connecting pipe socket.

For each connected remote client, the gateway server has, and provides, a remote client port remap. The port remap includes a lookup port remap table which maps ports available to the remote client to a socket port map either local or on a remote gateway server. Every pipe message received from the remote client is processed through the port remap and thereafter the socket port map, and the remote port number of the message is used to look up a redirected destination for the message.

The remote client port remap allows remote clients to be restricted to specific servers and tunnel pipe listeners that they are authorized to use.

Another aspect of the present invention is the inclusion of an intermediary registry. When active, each gateway server maintains a communication channel with the intermediary registry. Through this communication channel each gateway server advertises its availability to remote clients searching for a gateway server. Each gateway server also advertises its availability to other gateway servers in its gateway group, as they are potentially added or shut down and restarted and need to establish communication channels with their peers. The intermediary registry retains records for gateway servers that check in regularly; if a gateway server remains silent for too long, it will be assumed to be unavailable and will be from the matchmaking server's list.

Figure 4:
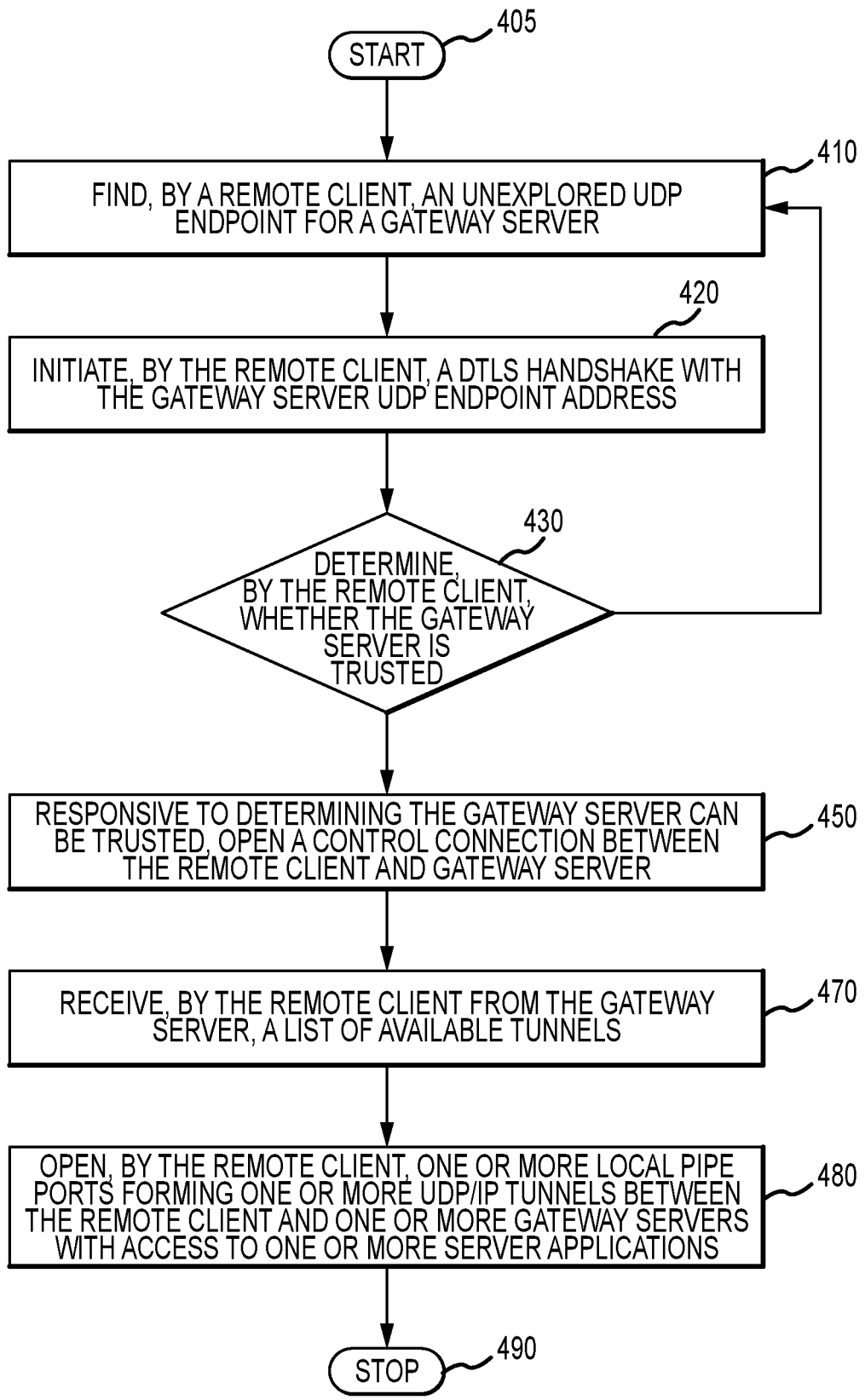
FIG. 4 is a high-level flowchart of one method embodiment for cloaked remote client access to one or more server applications.
Figure 5A:
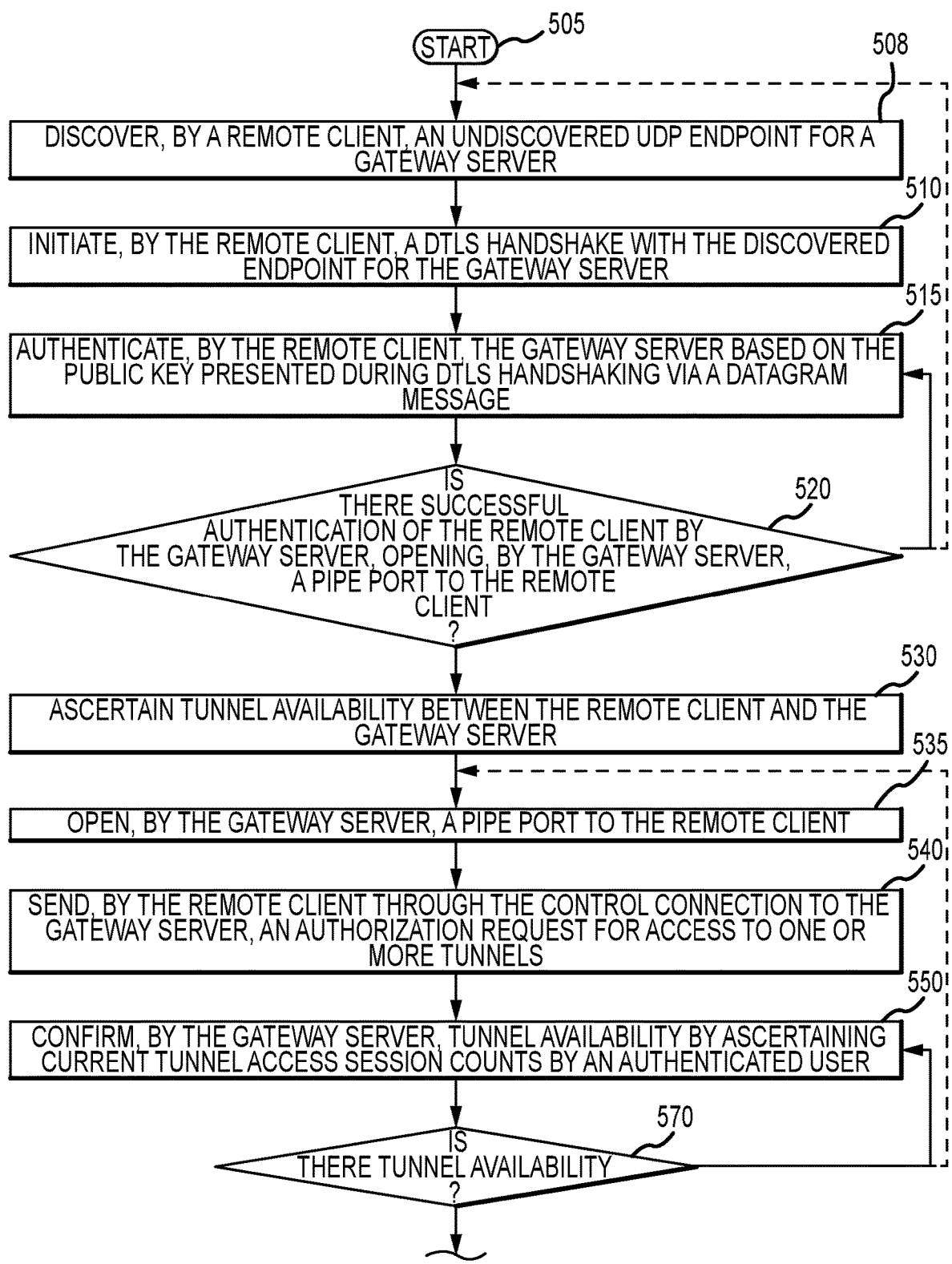
FIGS. 5A and 5B combine to form, according to one embodiment of the present invention, a detailed methodology flowchart for cloaked remote client access to one or more server applications.
Figure 5B:
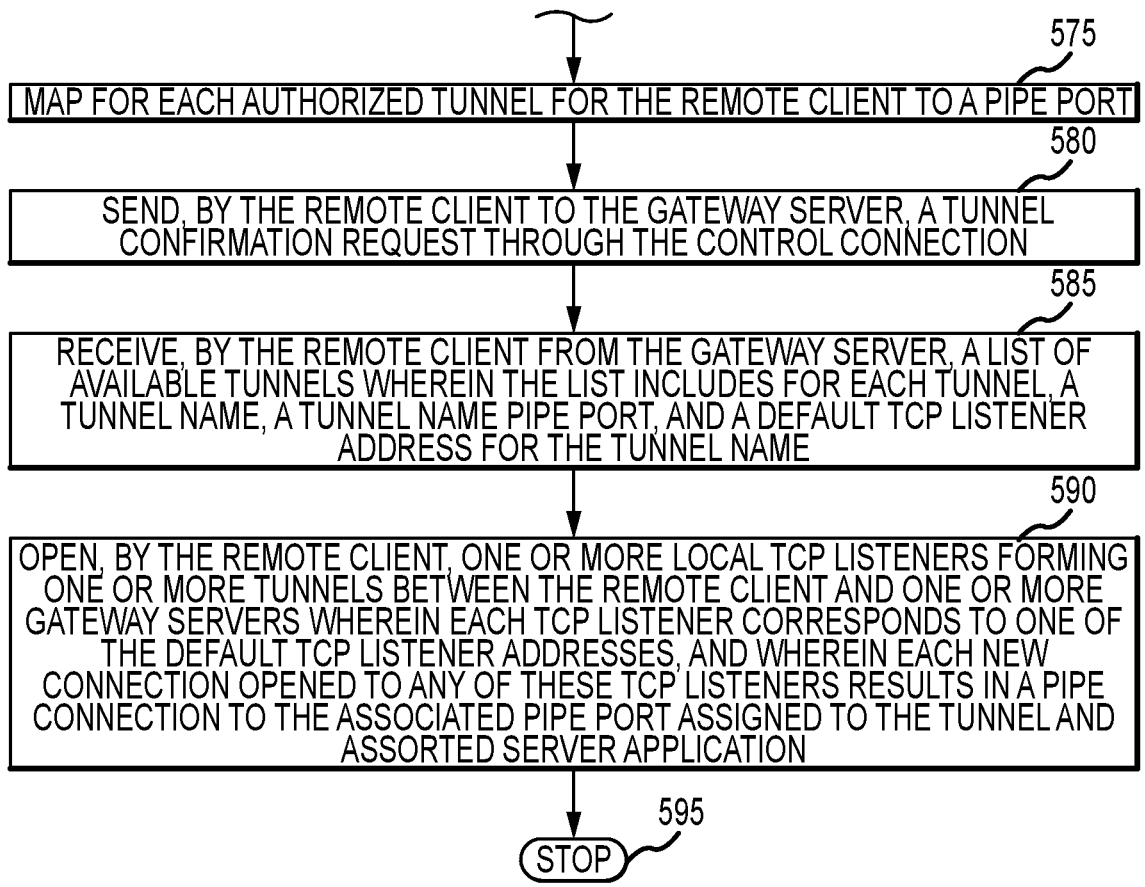

FIGS. 4 and 5 provide flowcharts depicting the steps by which a remote client establishes communication with a gateway server or servers and thereafter establishes TCP tunnels to a client application or applications. FIG. 5 complements the disclosure of FIG. 4 with additional details. The process begins 405, 505 with:

1. Finding 410, by the remote client, unexplored UDP endpoint 508 for a gateway server. This can be done:
   By searching a cache of previously used UDP endpoint addresses; or
   By contacting the intermediary registry.
      i. Perform a DNS lookup of the intermediary registry, retrieve one or more IPv4 and IPv6 address(es).
      ii. Perform a DTLS handshake with the intermediary registry endpoint address.
      iii. Issue a query command to the intermediary registry to retrieve data about one member of the gateway group.

2. When an unexplored UDP endpoint has been found, the remote client initiates 420, 510 a DTLS handshake with the gateway server's UDP endpoint address. If the unsuccessful, the remote server reinitiates its search for another a gateway server.

3. With the handshake complete, the remote client checks 430 whether the gateway server is trusted, based on the public key presented during the DTLS exchange 515. If the gateway server fails authentication, a new gateway server search is initiated.

4. During the authentication process the remote client waits for, and responds to, the gateway server's client authentication requests. Authentication methods used herein are flexible. The gateway server may request a username and password, a token, or may simply acknowledge the client as having passed authentication based on its DTLS public key. Authentication messages are sent over the datagram message channel per FIG. 3. One skilled in the relevant art will appreciate that multiple authentication methodologies may be employed without departing from the scope of the present invention.

5. With authentication complete, the gateway server opens a pipe port 520, such as port 7979, to the newly authenticated remote client, and permits a connection on that port. In this example the port will be referred to as the control port. Port 7979 is a well-known port number used for the control port.

6. The remote client thereafter opens a pipe connection 535 to the control port, port 7979, on the gateway server establishing 450 a control connection for the remote client.

7. The remote client thereafter sends an authorization request 540 through the control connection and waits for a response from the gateway server. As part of processing the authorization request, the gateway server checks 550 current session counts for the authenticated user and determines whether the remote client should be granted access to existing tunnels 530. If successful 570, the gateway server via the server tunnel gateway module maps each authorized tunnel for the remote client to a pipe port.

8. Concurrent with the authorization request, the remote client sends a tunnel configuration request 580 through the control connection, and again waits for a response. The response message from the server tunnel gateway module will include a list of tunnels 470, 585, each entry of the list including:
   The name of the tunnel;
   The pipe port to which the tunnel is mapped 575;
   The list of default TCP listener addresses for the tunnel.

9. For each configured tunnel, the remote client will open local TCP listeners 590 corresponding to its list of default TCP listener addresses. Each new connection opened to any of these TCP listeners results in a pipe connection to the associated pipe port 480 assigned to the tunnel, which eventually results in a connection to one or more destination server application(s) via TCP 495, 595.

After the remote client has completed connecting to a gateway server, it becomes ready to accept connections from the client application(s) so as to forward client data to the server application(s).

Figure 6:
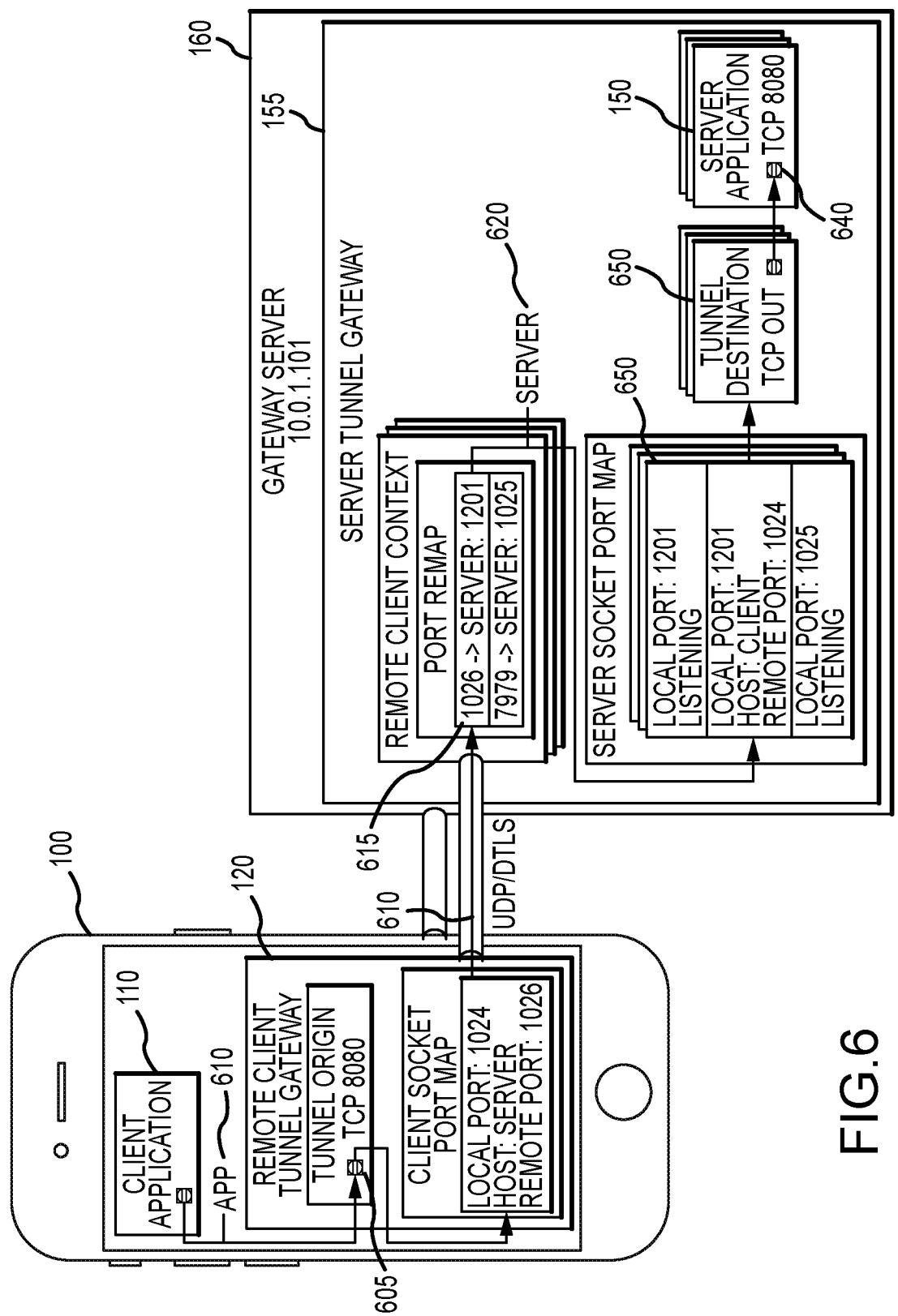
FIG. 6 depicts a client to gateway server configuration for cloaked remote client access according to one embodiment of the present invention.

To better understand the process by which a remote client gains access to a server application resident in a server cluster, consider the scenario shown by FIG. 6. Each connection made by the client application 110 will cause the remote client 100 initiate a pipe connection to the port configured for a tunnel as identified in the tunnel availability list on the server tunnel gateway module 155. FIG. 6 depicts a remote client 100 to gateway server 160 connection, according to one embodiment of the present invention, in which the server application 150 is resident on the gateway server 160. In FIG. 6, the remote client tunnel gateway module 120 has a TCP listener 605 open, and is listening on, port 8080 for a TCP tunnel called APP 610 between the client application 110 and the client tunnel gateway module 120. The client tunnel gateway module 120 thereafter initiates a new pipe connection 610 via UDP/DTLS to the server tunnel gateway module 155 resident on the gateway server 160 pipe port 1026 615.

As shown in FIG. 6 the gateway server's pipe port mapped to APP 610 is 1026. On the gateway server 160, the pipe port 1026 615 is remapped to SERVER 620, pipe port 1201 using the server's port remap table. Listening on pipe port 1201 630 on the server tunnel gateway module 155 is a TCP forwarder, which accepts the pipe connection, and initiates a new TCP connection to TCP port 8080 640 on the same server via remote port 1024. To complete the tunnel connection, the tunnel destination block 650 has opened a TCP connection to one or more server applications 150. In the FIG. 6 example, the tunnel destination block 650 and server applications 150 reside on the same gateway server 160.

The invention facilitates a remote client engaging a plurality of server applications. For example, the same remote client 100 may seek to engage a different client application resident on the gateway server shown in FIG. 6. The port remap resident on the server tunnel gateway 155 can map a different incoming UDP/DTLS pipe to a different tunnel destination and ultimately to a different server application.

In many cases, the gateway server to which the remote client is connected may not have access to each server application sought by the remote client. When a tunnel destination 650 is active on a gateway server 762 different from the server 764 where a remote client 100 is connected, the remote client port remap 720 will point to one or more gateway servers 762 on which the tunnel destination(s) 650 is/are active, and message traffic will be forwarded to that gateway server(s) 762 and finally to the server application(s) 150. This situation is exemplified in FIG. 7.

Pipe messages received from the remote client 100 to port 1026 615 are forwarded from SERVER1 764 to SERVER2 762 over their gateway-to-gateway UDP/DTLS communication channel 750, and ultimately to the tunnel destination block 650. One of reasonable skill in the art will recognize that there may be multiple servers to which the remote client and therefore SEVER1 764 must connect. Additionally, SERVER1 764 may also have a client application 150 to which the remote client is engaged. The remote client 100 and all tunnel gateway modules 755, 757 resident on each gateway server 762, 764 communicate with each other using UDP using one or more pipes. TCP tunnels 610, 620 are made accessible to the client tunnel gateway modules 120 through these pipes.

Each server tunnel gateway 755, 757 includes a remote client context 780 for each connected remote client 100. This context includes one or more port remap tables. Recall a client context represents a connection to a remote client and provides details such as the DTLS state, user identity and the like necessary for that connection. The port remap table 720 contains a list of pipe ports accessible to the remote client 100 and each pipe port's final destination 650 within the server cluster. For example, if the remote client connects to port X, each port remap table has a mapping for X → Server1: port Y. In doing so the remote client's communication to port X is redirected to Server1: port Y. Server1 port Y is a tunnel forwarder that provides TCP tunnel connectively to the desired server application. In the same way the remote client may have another connection to port Z wherein the port remap table port remap table has a mapping for Z Server4: port A. In doing so the remote client's communication to port Z is redirected to Server4: port A. Server4 port A is a tunnel forwarder that provides TCP tunnel connectivity to the desired application resident on Server4. Having multiple tunnel access provides access to multiple server applications. Communication redundancy is achieved through access to multiple servers.

The per-remote-client port remap provides isolation and virtualization of one or more pipe ports accessible to the remote client. It allows for fine-grained authorization for access to TCP tunnels and ultimately cloaked access to one or more server applications.

Below is a table comparing connectivity of the gateway server to a remote client.

TABLE 1

Remote client component comparison

| | Gateway Server | Remote Client |
|---|---|---|
| Connectivity to the Matchmaking Service | Continuous | Briefly, to make initial contact with a gateway server |
| Connectivity with Gateway Servers | Continuous contact with all other available gateway servers | Maintains contact with one gateway server only |
| Connectivity with Remote Clients | Accepts connections, does not initiate | None |
| Authentication | Public key | Flexible, username/password, OAuth, etc. |
| Authorization | Fully privileged | Tunnel access configured per user account |
| Tunnel Origins | As configured | As authorized by gateway server |
| Tunnel destinations | As configured | None |

Gateway servers form a fully connected network among their gateway group. Each gateway server maintains contact with every other gateway server in the gateway group. Gateway servers also maintain continuous contact with the intermediary registry. This continuous contact keeps the list of available gateway servers on the intermediary registry current and allows gateway servers that have recently started or restarted to query for and immediately make contact with their peers in their gateway group. By doing so each gateway server is aware of each client application or tunnel destination resident on each gateway server. It also allows remote clients to query for and immediately locate available gateway servers. For example, when a connection between a remote client and gateway server is broken, the remote client once again contacts the intermediary registry to identify a gateway server to reestablish contact. With contact reestablished, the new gateway server can immediately connect the remote client with the server application using the prior, exchanged mapping information.

Each remote client uses the intermediary registry to locate and make initial contact with one gateway server of the gateway group and maintains contact with that gateway server for the lifetime of its session. Remote clients communicate only with gateway servers, not other remote clients.

Gateway servers authenticate each other using pre-configured public key authentication. Connections between gateway servers are privileged, in the sense that when a connection is permitted, a gateway server on one side of a connection is allowed to effect reconfiguration of any or all aspects of the gateway server software on the other side. This is necessary to allow synchronization of configuration between gateway servers.

Figure 7:
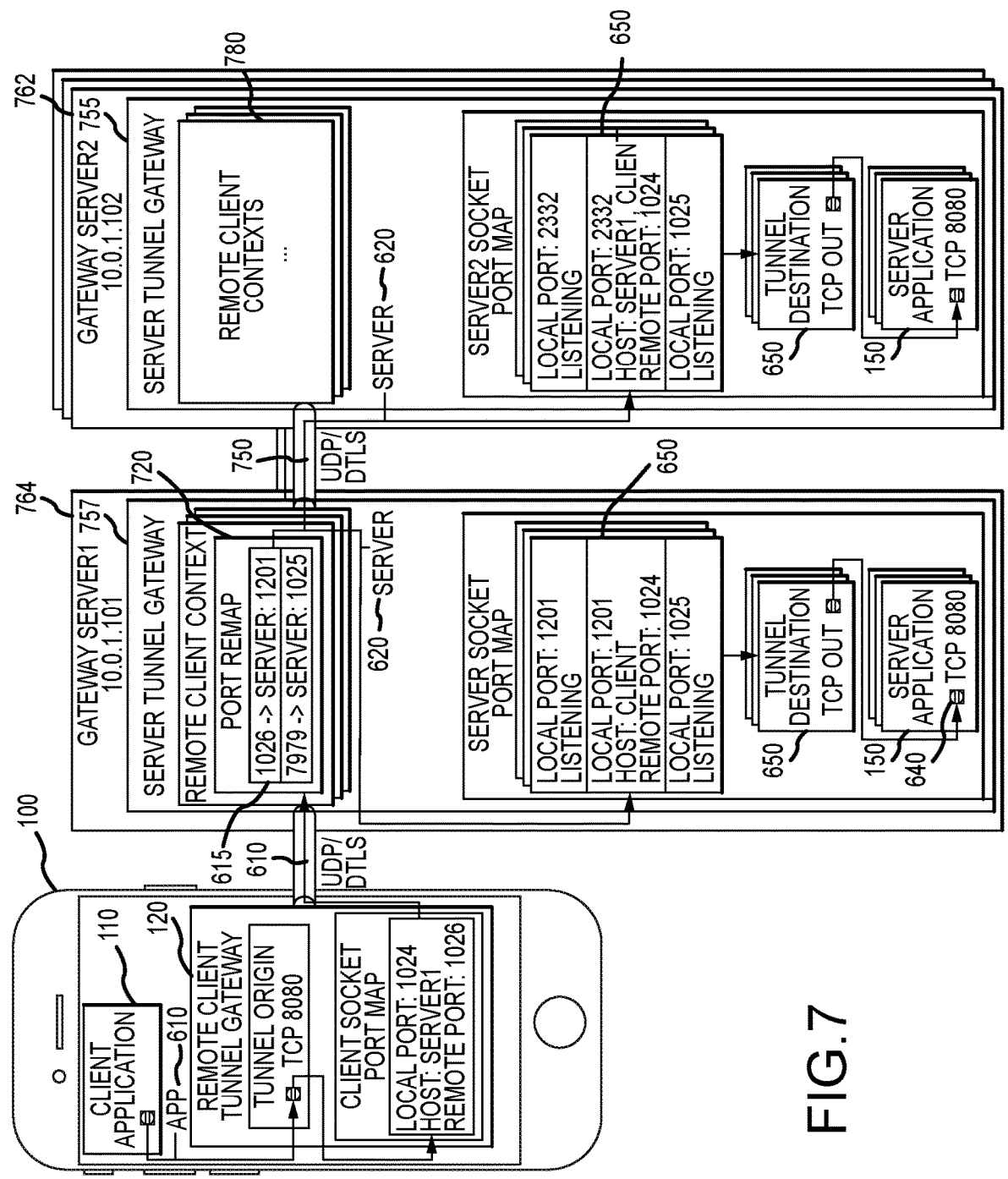
FIG. 7 depicts a client to server application connection through an intermediary gateway server, according to one embodiment of the present invention.

The remote client, as depicted in FIGS. 1, 6 and 7 behave as a TCP tunnel origin point—it opens one or more TCP listening sockets and accepts connections to be tunneled elsewhere via the gateway group. The destination point(s) of the tunnels accessible to a remote client are managed by the gateway group and may reside on any active gateway server within the gateway group.

The remote client is only required to establish communication with one gateway server in a gateway group in order to access all resources provided by the gateway group. While a gateway server maintains communication with all other gateway servers in the group, the remote client need only establish communication with one gateway server in order to access all resources. To support this, the gateway servers form an overlay network.

Figure 8:
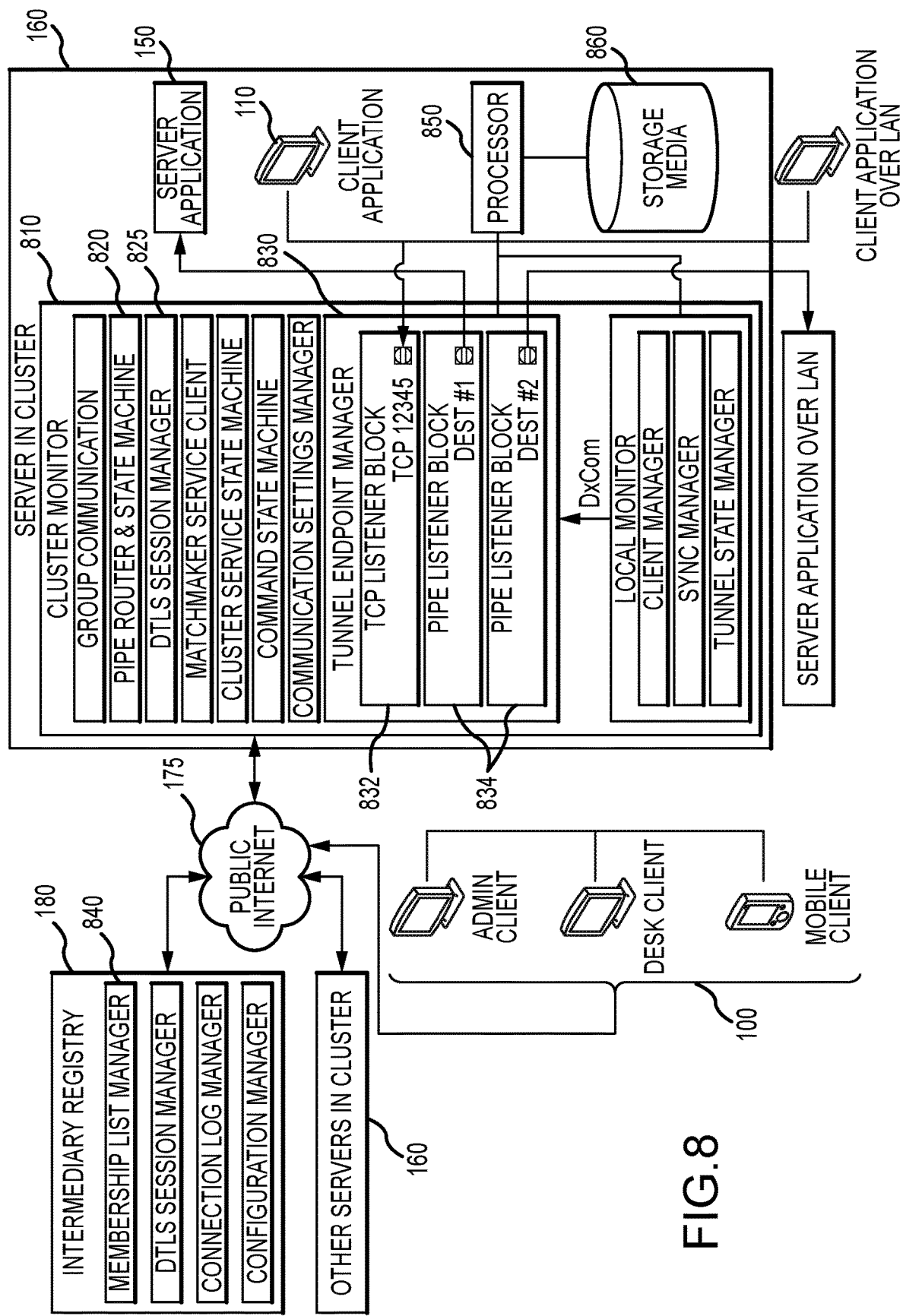
FIG. 8 is a component view of a gateway server within a network topology according to one embodiment of the present invention.

FIG. 8 presents a high-level block diagram of a network environment in which the present invention is implemented with additional component details of the servers in the cluster, intermediary registry. The present invention comprises the following components:

Cluster Monitor 810—responsible for establishing communication of all available servers participating in the tunnel gateway network, monitoring server availability, providing virtual synchrony through its coordinator, monitoring and synchronizing the state of attached service processes (Cluster Services), relaying commands between Cluster Service members, and maintaining tunnel endpoints. As the invention makes it possible and valuable to build networks of more than two tunnel gateway servers, the group of tunnel gateway servers will be referred to as a cluster, and the primary networking component, the Cluster Monitor. To the Cluster Monitor, a Cluster Service is an external software component participating in a named group. The Cluster Monitor informs all Cluster Services participating in the same group of each other's presence, and any changes that may occur to that group. The Local Monitor component functions as a Cluster Service. Each Cluster Monitor includes:

Group Communication—establishing communication with all available servers involved in the cluster, monitoring server availability and communication channels, and electing a server as the cluster coordinator.

Pipe Router and State Machine 820—Provides reliable, in-order stream-oriented messaging channels, over the unreliable, out-of-order, datagram-oriented UDP communication channel. Manages pipe sockets, both listening sockets and outgoing connections. The communication channels provided by this module are used by the Tunnel Endpoint Manager to establish new tunnel sessions and to exchange data on existing sessions. It is also used internally by other Cluster Monitor components to communicate with other servers. The pipe state machine is similar to the TCP module found in most host networking stacks and performs largely the same function. However, the invention calls for a private TCP-like software component within the Cluster Monitor component.

DTLS session manager—responsible for establishing authenticated DTLS sessions with other servers in the cluster over UDP Intermediary registry client—manages communication with the intermediary registry, including NAT configuration discovery, group registrations, and invitations Cluster Service State Machine—monitoring availability of Cluster Services, processing changes to the set of available Cluster Services, and informing active Cluster Service components running on each system of the current service membership.

Command State Machine—monitoring the state of relay commands submitted by various Cluster Services. Ensuring consistent ordering of relayed commands, and the reliability of responses are sent back to the issuers of those commands.

Communication Settings Manager—maintains administratively configured details of the cluster, including the list of systems, their network addresses, and cryptographic secrets. Managing the process of adding and removing systems in an active cluster.

Tunnel Endpoint Manager 830—responsible for creating, altering, or removing tunnel redirector endpoints based on global configuration. The Tunnel Endpoint Manager ensures that the tunnel configuration is synchronized between servers, processes updates to the global tunnel gateway configuration, and manages two different types of tunnel endpoints:

TCP Listener Block 832—Listens on a TCP socket. For each newly accepted connection, the TCP Listener Block will initiate a pipe connection to a preconfigured address. Upon successful connection, all data received from the accepted TCP socket will be forwarded to the pipe socket, and vice versa.

Pipe Listener Block 834—Listens on a pipe socket. For each newly accepted connection, the pipe listener block will initiate a TCP connection to a preconfigured address. Upon successful connection, all data received from the accepted pipe socket will be forwarded to the TCP socket, and vice versa.

Intermediary registry 180

Membership List Manager 840—maintains list of known servers that are in contact, the groups they claim to belong to, and informs other servers of the same group of changes to the group. Also handles invitation requests for cluster formation and the addition of new servers as well as queries from remote client.

DTLS session manager—responsible for establishing DTLS sessions with servers acting as clients. Not used for authentication, but for nominal message privacy Connection log manager—if enabled, maintains a log of which servers have been in contact, when contact is established, and when contact is lost. Used for potential metering and billing purposes Configuration manager—maintains configuration of the intermediary registry, including which addresses it should be listening on, and a server blacklist Local Monitor—The Local Monitor maintains configuration, for each server, state of tunnels, and provides an administrative interface.

Client Manager—handling incoming client requests, passing the requests to the Application Coordinator, and maintaining client connections.

Sync Manager—maintaining administrative configuration of virtual hosts and applications. Synchronizing configuration between systems as cluster membership changes.

Application Coordinator—executing administrative commands and synchronizing tunnel configuration with the Cluster Monitor. This component is responsible for maintaining the configuration, which describes a list of tunnels to be maintained across the cluster.

Client Application 110, Server Application 150—The invention supports the operation of TCP tunnels for use by these applications. TCP tunnels allow these applications to connect to one another through incongruent networks, such as across NAT routers, without opening access to the public Internet.

In addition to servicing TCP connection tunnels, the ordered, reliable communication channels provided by the Pipe Router and State Machine 820 are necessary for components internal to the Cluster Monitor 810, such as the Cluster Service State Machine and the Command State Machine. A pipe router communication channel is used to send commands to other servers in the cluster, to send responses back to command issuers, and to synchronize configuration.

An entry in the Application Coordinator's tunnel configuration table contains:

Destination gateway name—Cluster member that will operate the destination tunnel gateway Destination target address and port—Host to which the destination gateway will establish new tunnel connections One or more origins, including:
        a. Origin gateway name—Cluster member that will operate the origin tunnel gateway
        b. Origin listening address and port—Describes how the listening TCP port for the origin gateway will be created The Cluster Monitor, as part of forming a group of tunnel gateway servers, elects one specific member of that group to serve as the cluster coordinator. Any server in the group can serve as this role.

In the Cluster Monitor, the process of configuring a new tunnel has the following steps:

1. Cluster coordinator sends a request to the destination gateway server to create the pipe listener block. The pipe listener block will be configured to listen on a random pipe port and connect to the destination target address—the target server application for the tunnel.
2. The destination gateway server responds with the pipe port on which the listener block is bound.
3. Cluster coordinator sends requests to all origin gateway servers to create TCP listener blocks. The TCP listener blocks are configured to connect to the destination gateway server on the pipe port determined in step (2).

Internally, the Pipe Router and State Machine includes:

Socket port map 910—indexes all pipe router sockets by the local port they are bound to, as well as the remote port, if they are connected. Allows inbound messages to be quickly routed to the appropriate socket for processing.

Route index 920—Contains a DTLS state machine 938 and UDP communication channel details for each available peer, indexed by the peer's name. Each route provides a method of sending datagrams to a specific peer.

Figure 9:
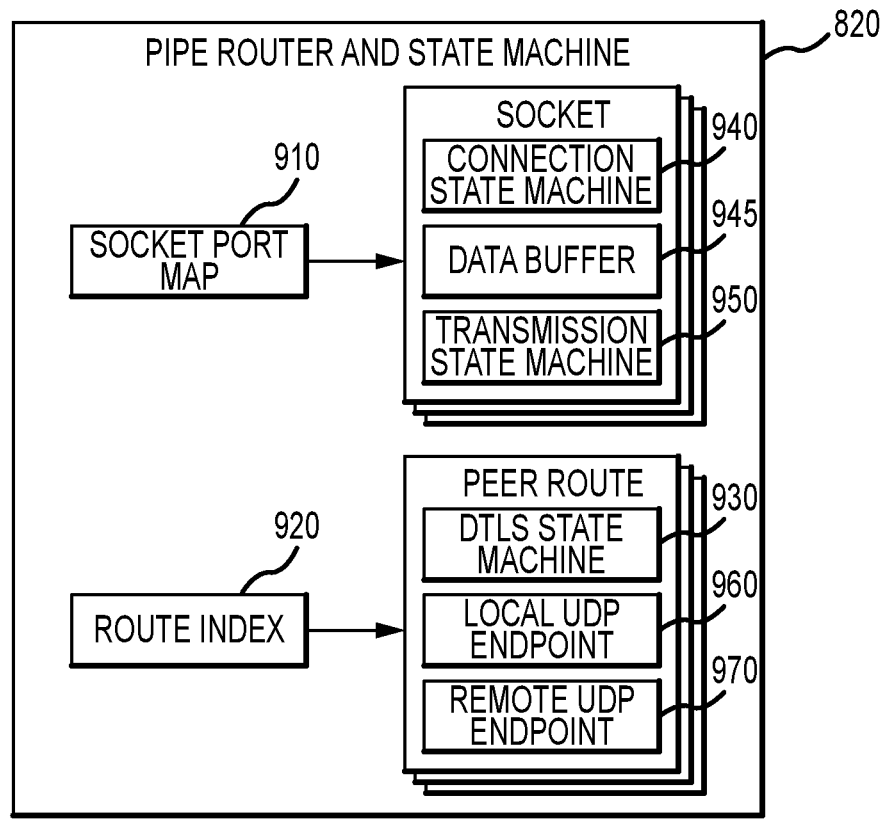
FIG. 9 is a block diagram of a Pipe Router and State Machine, according to one embodiment of the present invention.

Each socket is managed by the Pipe Router and State Machine as depicted in FIG. 9. The Pipe Router and State Machine includes:

Socket port map—indexes all pipe router sockets by the local port they are bound to, as well as the remote port, if they are connected. Allows inbound messages to be quickly routed to the appropriate socket for processing.

Connection state machine 940—Identifies the state of the connection of a particular socket and determines interpretation of newly-received messages. The socket states precisely follow those outlined for TCP by RFC 793, including:

SynSent—Connection request sent to other side, pending response

SynReceived—Connection request received; response not yet acknowledged

Established—Connection request acknowledged by both sides, neither side has requested the connection be closed FinWait1—Local side has requested connection closure, remote side has not requested closure, nor has acknowledged local closure request FinWait2—Local side has requested connection closure, remote side has not requested closure, but has acknowledged local closure Closing—Local side has requested connection closure, remote side has requested connection closure also, but has not yet acknowledged local closure TimeWait—Both sides have requested connection closure, remote side has acknowledged, but may require retransmission of local acknowledgment CloseWait—Remote side has requested connection closure; local side has sent acknowledgment but has not requested closure LastAck—Remote side has requested connection closure, local side has sent acknowledgment and then requested closure, but has not yet been acknowledged Listening—Socket is open to accept new connection requests Data buffer 945—Contains outbound data that has not yet been acknowledged by the other side, and inbound data that is received out-of-order.

Transmission state machine 958—Decides when and how to send locally-originating data to the remote side. Performs: measurement of network capacity and round-trip-time, message loss analysis, transmission throttling, timed retransmission, and connection timeout actions.

Route index 920—Contains a DTLS state machine 930 and UDP communication channel details 960, 970 for each available peer (local and remote end points), indexed by the peer's name. Each route provides a method of sending datagrams to a specific peer.

Figure 10:
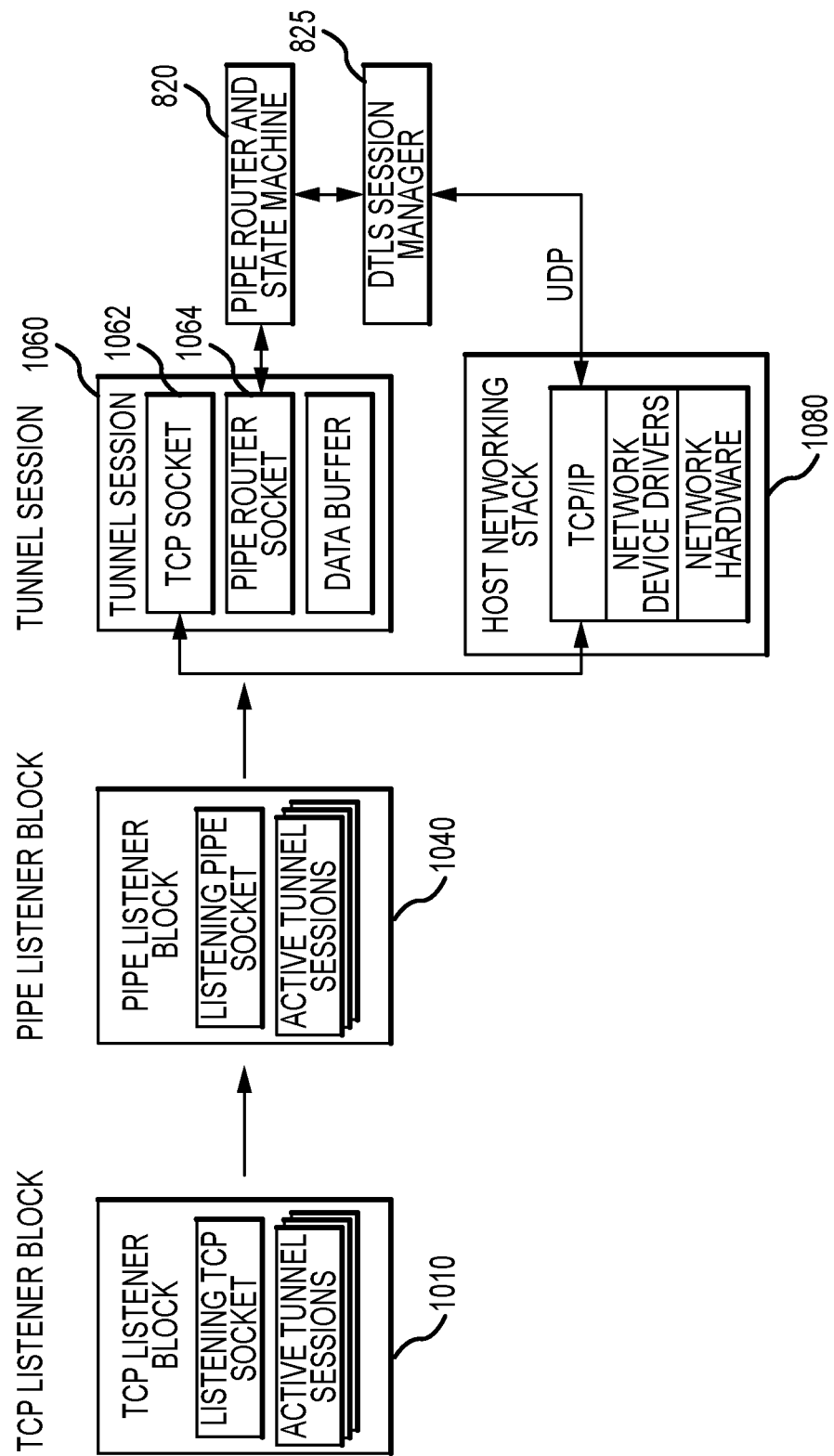
FIG. 10 shows the interaction of TCP listener blocks and pipe listener blocks resulting in a tunnel session, according to one embodiment of the present invention.

FIG. 10 provides additional details and components of the TCP Tunnel Listener Block 1010 and the Pipe Listener Block 1040 as related to a Tunnel Session 1060. A tunnel session 1060 represents an individual established connection and includes a TCP socket 1062 and a Pipe Router socket 1064. The Tunnel Session 1060 is created by a listener block for each connection that it accepts on its listening socket, and each listener block contains a set of Tunnel Sessions that it has created. The Tunnel Session component has two main responsibilities:

Forward data received on one socket to the other socket. As data is received from the TCP socket, it is sent to the pipe socket, and vice-versa. This also includes the possibility of quenching reception on one side when the other side is not accepting data as quickly as it is coming in.

Manage end-of-file and socket closure. Either side can initiate a close, and not necessarily at the same time. A closure event received on one socket must be forwarded to the other, and when both sides have completed closure, the tunnel session can be discarded.

Figure 11:
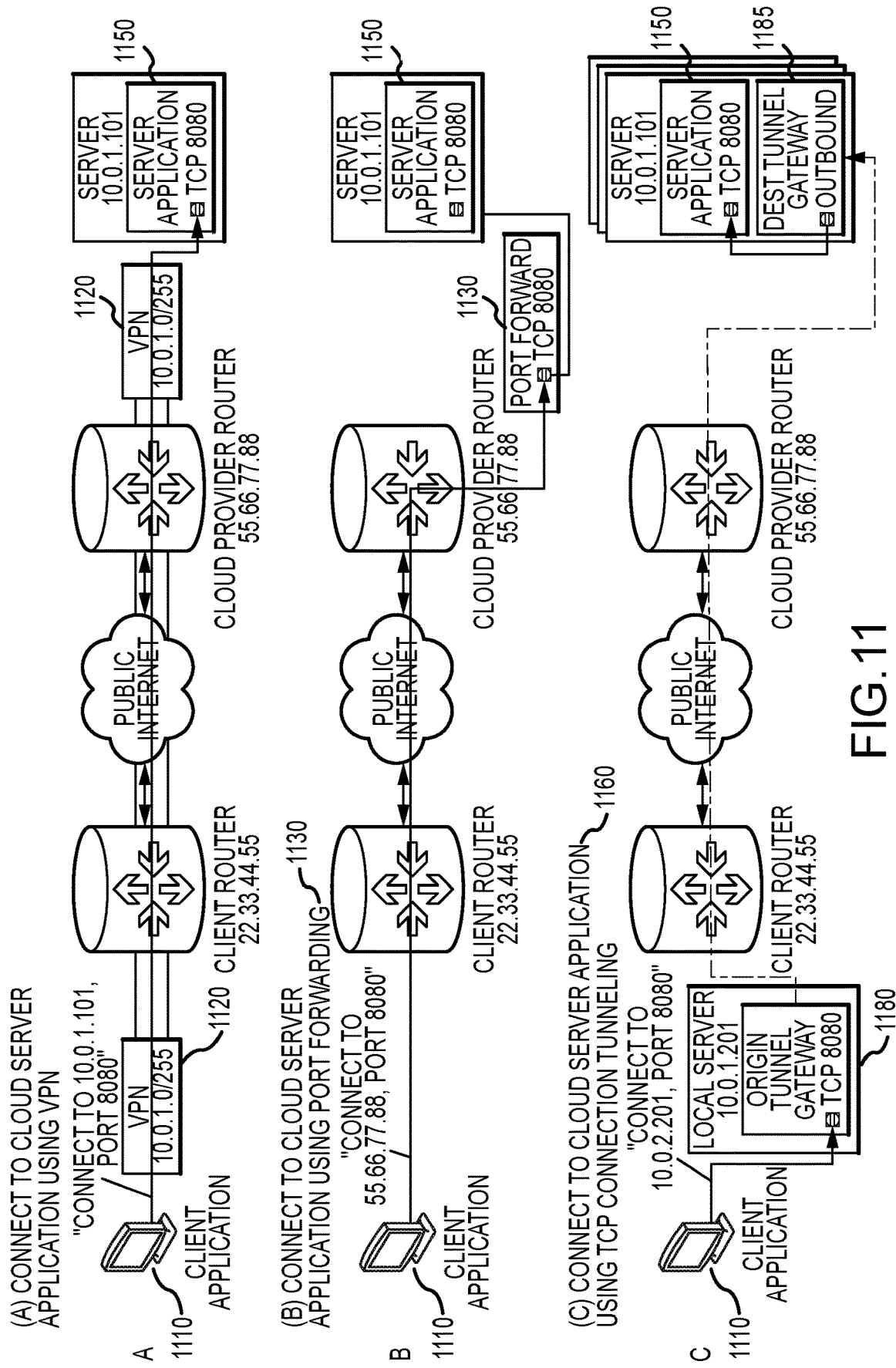
FIGS. 11 A-C presents comparative communication techniques coupling a client application with a server application, with FIG. 11C representing one embodiment of the present invention.

The invention facilitates secured communication tunnels between client and server applications using the TCP protocol, including over untrusted public Internet. Consider three scenarios for communication between client and server shown in FIGS. 11A-C. Each scenario in FIG. 11 begins with a client 1110 needing to connect to a server application 1150 over TCP. The client application 1110 runs on a host (remote client) attached to an internal network, which is connected to the public Internet through, in this example, a router that performs Network Address Translation (NAT). Likewise, the server gateway is, in this example, operated by a cloud hosting provider, and is attached to a different internal network, which is connected to the public Internet through the cloud provider's NAT router. Each NAT router has a single public IPv4 address that is used to communicate on the public Internet. Each NAT router isolates its internal network from the public Internet, but, for certain purposes, allows its single public IPv4 address to be "shared" by any number of hosts attached to the internal network. The NAT router allows TCP and UDP traffic originating from the internal network to be sent to destinations on the public Internet, and to appear to come from the NAT router's public address, by rewriting the IP and TCP headers as messages are routed. Because there is only one address serving a potentially large internal network, there is no possibility of addressing individual hosts on the internal network from the public Internet using IPv4. Typically, NAT routers allow communication from the public Internet to a host in the internal network using static port forwarding, which is described below, and requires special configuration of the NAT router. The current ubiquity of NAT routers makes this example relevant and interesting.

A common method of facilitating a connection from the client to the server application is with the use of a VPN is shown in FIG. 11A. A VPN 1120 creates a route for Internet protocol messages between the internal networks, with the internal addressing of those networks. In the example, to connect, the client requests to connect to 10.0.1.101 (the server's internal IP address), port 8080. The server application observes a connection from the client's internal IP address.

VPNs must integrate with network routing components, in order to provide a route to a subset of Internet protocol addresses and receive messages from other parts of the network destined to those addresses. A typical VPN will first establish itself as a network route with its local network router. It will then collect network messages that have been routed to a specific Internet Protocol address and include an Internet Protocol encapsulation. Each message is then encapsulated with a security layer for encryption and authentication, such as TLS, and transported to the other side using TCP, UDP, or GRE, depending on the VPN. The VPN component on the other side will decapsulate the original Internet Protocol message and deliver it to its local network router.

VPNs are typically complex to set up and require in-depth knowledge of networking. Avoiding this complexity is one of the primary goals of the invention.

The Internet protocol level addressability provided by VPNs makes them a complete solution for network integration. Applications other than the one server application can be accessed from the client's internal network. Also, applications that use protocols other than TCP can be accessed and hosts from the server's internal network can address and connect to hosts on the client's internal network. In most situations, this is desirable. In other situations, suppose the client's internal network contains potentially malicious actors, the full connectivity of a VPN is undesirable for security reasons, and must be limited through the addition of a firewall, which adds further complexity.

Another method of facilitating a TCP connection from the client to the server application is through port forwarding 1130 shown in FIG. 11B. Port forwarding is a feature specific to NAT routers, where an external TCP port associated with the router's public Internet address is redirected to a specific internal address and TCP port. To do this, the NAT router must be specifically configured. In the example, to connect, the client requests to connect to 55.66.77.88 (the server NAT router's public IP address), port 8080. The server application observes a connection from 22.33.44.55 (the public Internet address of the client NAT router).

Port forwarding allows the client to connect to the server application. However, it also allows any other host on the public Internet to connect to the server application, which can be a security concern. Some NAT routers allow restrictions on which addresses are allowed to connect to a forwarded port.

TCP connection tunneling 1160 of in FIG. 11C, as per the present invention, provides a greater degree of isolation, by providing the client application with access to the server application and only the server application, without the possibility of access from the public Internet. In the example, the client requests to connect to 10.0.1.201 (The tunnel gateway server), port 8080 1180. The server application observes a connection from 10.1.0.101 (itself, as the destination gateway is operating on the same server).

In addition to restricting access from the public Internet, TCP connection tunneling can also be used to restrict internal network access to the server application. In this situation, the destination gateway 1185 must operate on the same server as the server application 1150, and the server application must be configured to open its listening TCP port on the loopback address. This permits only client applications running on the server to connect to the server application, or any client able to connect to the origin gateway side of the tunnel.

Figure 12:
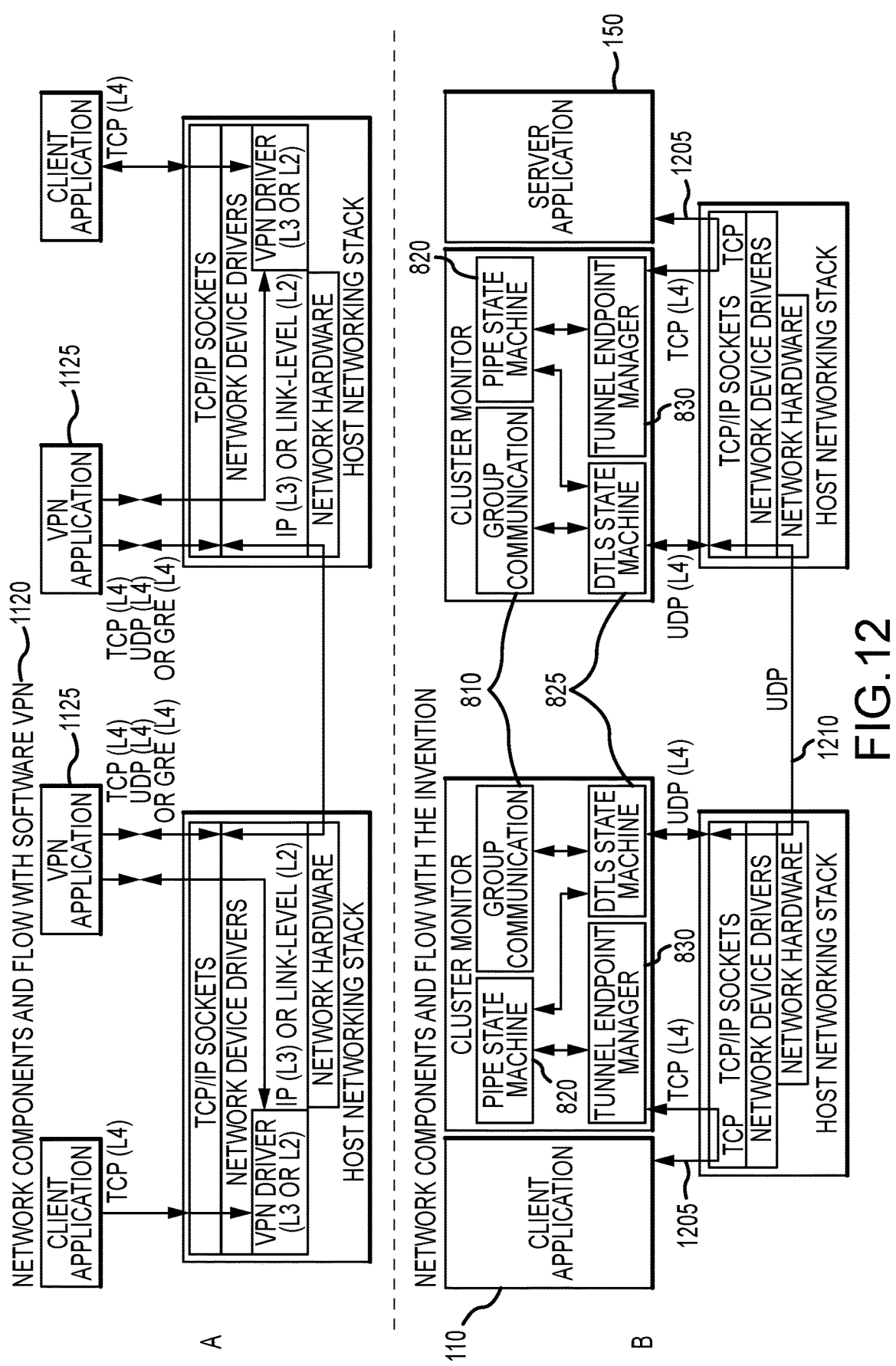
FIGS. 12A and 12B depict network component and flow analysis, according to one embodiment of the present invention.

With additional reference to FIG. 12, compared to a software VPN, the present invention behaves much differently. As described above, the example software VPN integrates with a network routing layer by establishing a route for the remote side of the network and proceeds to collect messages destined to the set of network addresses mapped to the other side. In FIG. 12A, this is performed by the VPN component 1125. On Linux, for example, this VPN driver can be PPP, L2TP, or TUN/TAP. The VPN driver collects messages that have been generated by the layer-4 TCP state machine of the host networking stack and routed by the layer-3 Internet Protocol component of the host networking stack. The messages are processed by a VPN application component, which encapsulates them for security, and transports them to a counterpart VPN application using TCP, UDP, or GRE. The counterpart VPN application decapsulates the messages and injects them into the VPN driver so that they can be processed by the Internet Protocol layer of the host networking stack.

TCP tunneling as performed by the invention shown in FIG. 12B, does not interact with the host networking stack at any layers below layer 4. The Cluster Monitor 810 component receives application payloads from the client application's 110 TCP session 1205, processes them through its tunnel endpoint manager 830, pipe state machine 820, and DTLS state machine components 825, and transports them to the Cluster Monitor 810 on the other side.

The present invention specifies the use of the datagram oriented UDP protocol 1210 for communication between tunnel gateways. The use of TCP as the transport would substantially simplify the design of the invention, but is rejected for three reasons:

- Endpoint discovery on NAT routers is substantially more reliable using UDP
- UDP allows for more accurate assessment of liveness of peers, as every message received from a peer is processed by a component of the invention, whereas with TCP, the host networking stack will not inform the application of any message that does not contain the next unreceived data block.
- UDP makes it harder for an unwanted 3rd party to eavesdrop on transmitted data, as data messages are scrambled and delivered unordered.

The invention encourages the use of a single UDP port for all styles of communication between servers, as well as with the intermediary registry. This supports the goal of reliable endpoint discovery.

The invention is capable of facilitating direct communication between two servers in situations where one server sits behind a symmetric NAT, as long as the other server does not also sit behind a symmetric NAT. This is enabled by bidirectional attempts to initiate communication, where the outbound attempt from the server behind the non-symmetric NAT may be blocked by the symmetric NAT, but the outbound attempt of the server behind the symmetric NAT will not be blocked by the non-symmetric NAT.

The present invention enables TCP tunneling over the public Internet through a specialized role of the remote client. Controlled access to TCP network services is provided to lightweight remote clients through flexible authentication, fine-grained access control of specific clients to TCP network services, and highly available, fault-tolerant access to the network services.

The present invention specifies the use of the datagram oriented UDP protocol for communication between tunnel gateways. The use of the datagram oriented UDP protocol rather than TCP as the transport mechanism simplifies the design while maintaining TCP tunnels between client and server applications for data transfer.

It will be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

Software programming code which embodies the present invention is typically accessed by a microprocessor 850 from long-term, persistent storage media 860 of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Appreciate that the invention can be practiced with other computer system configurations, including hand-held devices, multi-processor systems, microprocessor-based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located in both local and remote memory storage devices.

While there have been described above the principles of the present invention in conjunction with a method for TCP tunneling over the Internet, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate claims to such features and/or combinations of such features during the prosecution of the present application or of any further application derived therefrom.

What is claimed is:

1. A computer implemented system for cloaked remote client to server application access, the computer system comprising:
   a plurality of servers operating as a server cluster forming an overlay network in which each server of the plurality of servers maintains an active communication channel with every other server of the plurality of servers, and wherein each server includes a server tunnel gateway module that includes,
   one or more User Datagram Protocol (UDP) communication sockets that mediate connectivity between a client tunnel gateway module of a remote client and that server tunnel gateway module of the plurality of servers in the server cluster, and
   a list of available tunnels to other servers in the server cluster for that client server tunnel gateway module, the remote client having a client application with client application data; and
   one or more server applications communicatively coupled with one of plurality of server tunnel gateway modules wherein responsive to lack of connectivity between the remote client and the one of the plurality of server tunnel gateway modules, the remote client selects any other available server in the overlay network reestablishing connectivity to any of the one or more server applications coupled to the one of the plurality of server tunnel gateway modules from the list of available tunnels and
   wherein, responsive to the 2Ser. No. 17/135,533 Reply to Office Action of 26 Jul. 2022 remote client connecting with the another of the one or more server gateways, the server gateway tunnel module creates a client context for the remote client, the client context including a port remap table having an entry for each available tunnel.

2. The computer implemented system according to claim 1, wherein the client tunnel gateway module opens one or more Transmission Control Protocol (TCP) ports to connect with one or more of the plurality of servers.

3. The computer implemented system according to claim 1, wherein the client tunnel gateway module includes a client Transmission Control Protocol (TCP) listener open for an application tunnel with the client application.

4. The computer implemented system according to claim 3, wherein the application tunnel is mapped to a client tunnel origin associated with the client tunnel gateway.

5. The computer implemented system according to claim 4, further comprising one or more server pipe listeners wherein one of the one or more server pipe listeners includes an open port to connect the client tunnel gateway with the server tunnel gateway.

6. The computer implemented system according to claim 5, further comprising one or more tunnel connections between the client tunnel origin and one or more server tunnel destinations associated with the server tunnel gateway.

7. The computer implemented system according to claim 6, wherein the one or more server tunnel destinations opens a Transmission Control Protocol (TCP) connection with each server application thereby connecting each server application to the client application via one of the one or more tunnel connections.

8. The computer implemented system according to claim 7, wherein the one or more server tunnel destinations may be located on any server within the server cluster or any server communicatively coupled to any other server within the server cluster.

9. The computer implemented system according to claim 1, wherein transport connectivity between the remote client and the server tunnel gateway module is via UDP/Internet Protocol (IP) protocols with Datagram Transport Layer Security (DTLS) secure encapsulation.

10. The computer implemented system according to claim 1, wherein each of the one or more server applications includes one or more Transmission Control Protocol (TCP) listening ports to interact with the client application.

11. The computer implemented system according to claim 1, wherein the one or more server applications are each communicatively coupled to the server tunnel gateway module through a direct layer-4 Transmission Control Protocol (TCP) network route.

12. The computer implemented system according to claim 1, further comprising an intermediary registry communicatively coupled to each of the plurality of servers and the remote client wherein the intermediary registry maintains a list of available servers in the server cluster.

13. A method for cloaked remote client to server application access, the method comprising:
   establishing a control connection between a remote client and one of a plurality of gateway servers using User Datagram Protocol (UDP) protocols with Datagram Transport Layer Security (DTLS) secure encapsulation, wherein the plurality of gateway servers operate as a server cluster forming an overlay network wherein which each server of the plurality of gateway4Ser. No. 17/135,533 Reply to Office Action of 26 Jul. 2022 servers maintains an active communication channel with every other server of the plurality of gateway servers;
   receiving, by the remote client from the one of the plurality of gateway servers, a list of available tunnels for connectivity to one or more server applications wherein the list includes for each available tunnel, a tunnel name, a tunnel name pipe port, and a default Transmission Control Protocol (TCP) listener address for the tunnel name; and
   opening, by the remote client, one or more pipe ports forming one or more UDP channels between the remote client and one or more of the plurality of gateway servers,
wherein each pipe port corresponds to one of the available tunnels and wherein responsive to lack of connectivity between the remote client and the one of the plurality of gateway servers, the remote client selects any other server from the server cluster reestablishing connectivity to the one or more server applications from the list of available tunnels wherein, responsive to establishing a control connection, the server gateway tunnel module creates a client context for the remote client, the client context including a port remap table having an entry for each available tunnel.

14. The method according to claim 13, wherein establishing includes discovering, by the remote client, an undiscovered UDP endpoint for each gateway server.

15. The method according to claim 14, further comprising initiating, by the remote client, a DTLS handshake with the discovered endpoint for each gateway server.

16. The method according to claim 15, further comprising authenticating, by the remote client, each gateway server based on a public key presented during DTLS handshaking via a datagram message.

17. The method according to claim 16, responsive to successful authentication of the remote client by each gateway server, further comprising opening, by each gateway server, a pipe port to the remote client.

18. The method according to claim 17, further comprising opening, by the remote client, a pipe connection to the pipe port establishing a control connection.

19. The method according to claim 13, wherein ascertaining includes sending, by the remote client through the control connection an authorization request for access to one or more tunnels.

20. The method according to claim 19, further comprising confirming tunnel availability by ascertaining current tunnel access session counts by an authenticated user.

21. The method according to claim 20, responsive to confirming tunnel availability, further comprising mapping each authorized tunnel for the remote client to a unique pipe port.

22. The method according to claim 21, further comprising sending, by the remote client to the gateway server, a tunnel confirmation request through the control connection.

23. The method according to claim 13, wherein each new connection opened to any TCP listeners results in a pipe connection to an assigned tunnel pipe port.

* * * * *